US007912705B2

(12) United States Patent
Wasson et al.

(10) Patent No.: US 7,912,705 B2
(45) Date of Patent: Mar. 22, 2011

(54) SYSTEM AND METHOD FOR EXTRACTING INFORMATION FROM TEXT USING TEXT ANNOTATION AND FACT EXTRACTION

(75) Inventors: Mark D. Wasson, Seattle, WA (US); James S. Wiltshire, Jr., Springboro, OH (US); Donald Loritz, Springboro, OH (US); Steve Xu, Beavercreek, OH (US); Shian-jung Dick Chen, Springboro, OH (US); Valentina Templar, Las Vegas, NV (US); Eleni Koutsomitopoulou, Richmond (GB)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 0 days.

(21) Appl. No.: 12/689,629

(22) Filed: Jan. 19, 2010

(65) Prior Publication Data

US 2010/0195909 A1    Aug. 5, 2010

Related U.S. Application Data

(63) Continuation of application No. 10/716,202, filed on Nov. 19, 2003, now abandoned.

(51) Int. Cl.
*G06F 17/27* (2006.01)
*G06F 7/00* (2006.01)
*G06F 17/21* (2006.01)

(52) U.S. Cl. ............. 704/9; 707/705; 715/230; 715/256

(58) Field of Classification Search .......... 704/9; 707/3; 715/230, 256
See application file for complete search history.

(56) References Cited

U.S. PATENT DOCUMENTS

| 5,890,103 | A  | 3/1999 | Carus |
| 6,108,698 | A  | 8/2000 | Tenev et al. |
| 6,279,017 | B1 | 8/2001 | Walker |
| 6,385,630 | B1 | 5/2002 | Ejerhed |
| 6,442,545 | B1 | 8/2002 | Feldman et al. |
| 6,714,939 | B2 | 3/2004 | Saldanha et al. |
| 6,910,003 | B1 | 6/2005 | Arnold et al. |

(Continued)

OTHER PUBLICATIONS

Ravichandran, D. and Hovy, E. 2001. Learning surface text patterns for a Question Answering system. In Proceedings of the 40th Annual Meeting on Association For Computational Linguistics (Philadelphia, Pennsylvania, Jul. 7-12, 2002). Annual Meeting of the ACL. Association for Computational Linguistics, Morristown, NJ, 41-47.

(Continued)

*Primary Examiner* — James S Wozniak
*Assistant Examiner* — Paras Shah
(74) *Attorney, Agent, or Firm* — Dinsmore & Shohl LLP

(57) ABSTRACT

A fact extraction tool set ("FEX") finds and extracts targeted pieces of information from text using linguistic and pattern matching technologies, and in particular, text annotation and fact extraction. Text annotation tools break a text, such as a document, into its base tokens and annotate those tokens or patterns of tokens with orthographic, syntactic, semantic, pragmatic and other attributes. A user-defined "Annotation Configuration" controls which annotation tools are used in a given application. XML is used as the basis for representing the annotated text. A tag uncrossing tool resolves conflicting (crossed) annotation boundaries in an annotated text to produce well-formed XML from the results of the individual annotators. The fact extraction tool is a pattern matching language which is used to write scripts that find and match patterns of attributes that correspond to targeted pieces of information in the text, and extract that information.

21 Claims, 6 Drawing Sheets

U.S. PATENT DOCUMENTS

| | | | |
|---|---|---|---|
| 2001/0018697 | A1 | 8/2001 | Kunitake et al. |
| 2002/0013694 | A1 | 1/2002 | Murata et al. |
| 2002/0103775 | A1 | 8/2002 | Quass et al. |
| 2002/0165717 | A1 | 11/2002 | Solmer et al. |
| 2002/0177991 | A1 | 11/2002 | Ejerhed |
| 2003/0007397 | A1 | 1/2003 | Kobayashi et al. |
| 2003/0154070 | A1 | 8/2003 | Tokuda et al. |
| 2003/0158723 | A1 | 8/2003 | Masuichi et al. |
| 2003/0167162 | A1 | 9/2003 | Simpson et al. |
| 2003/0229854 | A1 | 12/2003 | Lemay |
| 2004/0078190 | A1 | 4/2004 | Fass et al. |
| 2004/0243556 | A1* | 12/2004 | Ferrucci et al. ............... 707/3 |
| 2004/0243645 | A1 | 12/2004 | Broder et al. |
| 2005/0066271 | A1 | 3/2005 | Uchiyama et al. |
| 2005/0154979 | A1 | 7/2005 | Chidlovskii et al. |

OTHER PUBLICATIONS

Litkowski, K. C. (2003a). Question Answering Using XML-Tagged Documents. In E. M. Voorhees & L.P. Buckland (eds.), The Eleventh Text Retrieval Conference (TREC 2002). NIST Special Publication 500-251. Gaithersburg, MD., 122-131.

Collard, M.L.; Kagdi, H.H.; Majestic, J.I., "An XML-based lightweight C++ fact extractor," Program Comprehension, 2003. 11th IEEE International Workshop on, vol., No., pp. 134-143, May 10-11, 2003.

Simov, K., Osenova, P., Slavecheva, M., Kolkovsha, S., Balabanova, E., Doikoff, D., Ivanova, K., Simov, A., & Kouylekov, M. (2002). Building a linguistically interpreted corpus of Bulgarian:the BulTreeBank. In Proceedings of Third International Conference on Language Resources and Evaluation LREC-2002 (pp. 1729-1736). Las Palmas de Gran Canaria, Spain.

Krauthammer M., Johnson S.B., Hripcsak G., Campbell D.A., and Friedman C. Representing nested semantic information in a linear string of text using XML. Proc AMIA Symp. 405-9, 2002.

R. Grishman et al., "Message Understanding Conference—6: A Brief History" (Nov. 1996). "Proceedings of the 16th International Conference on Computational Linguistics," Copenhagen, (Jun. 1996), pp. 466-471.

D. Appelt et al., "Introduction to Information Extraction Technology, A Tutorial Prepared for IJCAI-99," "Proceedings of the 16th International Joint Conference on Artificial Intelligence" (Jul. 31-Aug. 6, 1999), pp. 1-41.

B. Glasgow, "MITA: An Information Extraction Approach to Analysis of Free-form Text in Life Insurance Applications," "AI Magazine," 19(1):59-71, 1998.

R. Feldman et al., "Text Mining at the Term Level," "Proc. of the 2nd European Symposium on Principles of Data Mining and Knowledge Discovery" (Nantes, France, Sep. 1998), pp. 1-9.

H. Cunningham, "Software Architecture for Language Engineering," Ph.D. Thesis, Department of Computer Science, University of Sheffield (Jun. 2000), p. i (Abstract), Table of Contents, List of Figures, Chapter 7, and Appendix A.

H. Cunningham et al., "Experience of using GATE for NLP R&D," "Proceedings of the Workshop on Using Toolsets and Architectures to Build NLP Systems at COLING-2000," (Luxembourg 2000), pp. 1-8.

R. Grishman, "Real-Time Event Extraction for Infectious Disease Outbreaks," "Proceedings of Human Language Technology Conference (HLT) (2002)," pp. 1-4.

B. Crysmann, "An Integrated Architecture for Shallow and Deep Processing," Proceedings of ACL-2002, "Association for Computational Linguistics 40th Anniversary Meeting" (Jul. 2002), pp. 1-8.

H. Cunningham, "Developing Language Processing Components with GATE (a User Guide) for GATE version 2.1 beta 1 (Aug. 2002," University of Sheffield (2001-2002) Table of Contents, and Chapters 5 and 6.

K. Bontcheva, "Using Human Language Technology for automatic Annotation and Indexing of Digital Library Content," "Proceedings of the 6th European Conference on Research and Advanced Technology for Digital Libraries" (2002), pp. 613-625.

R. Feldman, "Mining biomedical literature using information extraction," "Current Drug Discovery" (Oct. 2002) pp. 19-23.

H. Cunningham et al., "GATE: an Architecture for Development of robust HLT Applications," "Proceedings of ACL 2002" (2002), pp. 1-8.

D. Maynard, "Architectural Elements of Language Engineering Robustness," "Journal of Natural Language Engineering—Special Issue on Robust Methods in Analysis of Natural Language Data" 1 (1):1-20 (2002).

J. Hobbs et al., "FASTUS: Extracting Information from Natural-Language Texts," "Finite State Devices for Natural Language Processing" (MIT Press 2000), pp. 1-22.

S. Miller et al. "A Novel Use of Statistical Parsing to Extract Information from Text," 6th Applied Natural Language Processing Conference (2000), pp. 1-8.

J. Hobbs et al., "FASTUS: A Cascaded Finite-State Transducer for Extracting Information from Natural-Language Text," "Finite State Devices for Natural Language Processing" (MIT Press 1996), pp. 1-22.

"FindEngineTM white paper, Version 1.0," Hapax Information Systems AB (Sep. 2001) pp. 1-14.

B. Baldwin, "EAGLE: An Extensible Architecture for General Linguistic Engineering," "Proceedings of RIAO '97" (Jun. 1997), pp. 271-283.

Mitchell Marcus, Grace Kim, Mary Ann Marcinkiewicz, Robert MacIntyre, Ann Bies, Mark Ferguson, Karen Katz, Britta Schasberger, The Penn Treebank: annotating predicate argument structure. Proceedings of the workshop on Human Language Technology, Mar. 8-11, 1994, Plainsboro, NJ [doi>10.3115/1075812. 1075835].

H. Cunningham, D. Maynard, V. Tabian, C. Ursu and K. Bontceva: "Developing Language Processing Compnents with GATE." GATE v2.0 User Guide, University of Sheffield, 2002. http://nrrc.mitre.org/NRRC/02_results/tao.pdf.

* cited by examiner

SYSTEM AND METHOD FOR EXTRACTING INFORMATION FROM TEXT USING TEXT ANNOTATION AND FACT EXTRACTION

CROSS-REFERENCE TO RELATED APPLICATIONS

The present patent application is a continuation of application Ser. No. 10/716,202, filed Nov. 19, 2003 now abandoned which is incorporated herein by reference in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates to the extraction of targeted pieces of information from text using linguistic pattern matching technologies, and more particularly, the extraction of targeted pieces of information using text annotation and fact extraction.

BACKGROUND OF THE INVENTION

Definitions and abbreviations used herein are as follows:

Action—an instruction concerning what to do with some matched text.

Annotation Configuration—a file that identifies and orders the set of annotators that should be applied to some text for a specific application.

Annotations—attributes, or values, assigned to words or word groups that provide interesting information about the word or words. Example annotations include part-of-speech, noun phrases, morphological root, named entities (such as Corporation, Person, Organization, Place, Citation), and embedded numerics (such as Time, Date, Monetary Amount).

Annotator—a software process that assigns attributes to base tokens or to constituents or that creates constituents from patterns of one or more base tokens.

Attributes—features, values, properties or links that are assigned to individual base tokens, sequences of base tokens or related but not necessarily adjacent base tokens (i.e., patterns of base tokens). Attributes may be assigned to the tokenized text through one or more processes that apply to the tokenized text or to the raw text.

Auxiliary definition—in the RuBIE pattern recognition language, a statement or shorthand notation used to name and define a sub-pattern for use elsewhere.

Base tokens—minimal meaningful units, such as alphabetic strings (words), punctuation symbols, numbers, and so on, into which a text is divided by tokenization. Base tokens are the minimum building blocks for a text processing system.

Case-corrected—text in which everything is lower case except for named entities.

Constituent—a base token or pattern of base tokens to which an attribute has been assigned. Although constituents often consist of a single base token or a pattern of base tokens, a constituent is not necessarily comprised of contiguous base tokens. An example of a non-contiguous constituent is the two-word verb <u>lookedup</u> in the sentence He<u>looked</u>the address<u>up</u>.

Constituent attributes—those attributes that are assigned to a pattern of one or more base tokens that represent a single constituent.

Label—an alphanumeric string that uniquely identifies a pattern recognition rule or auxiliary definition.

Machine learning-based pattern recognition—pattern recognition in which a statistic-based process might be given a mix of example texts that do and do not represent the targeted extraction result, and the process will attempt to identify the valid patterns that correspond to the targeted results.

Pattern—a description of a number of base tokens that should be recognized in some way, where the recognition of the tokens is primarily driven by targeted attributes that have been assigned to the text through annotation processes. One or more annotation value tests, zero or more recognition shifts, zero or more regular expression operators, and zero or more XPath-based (tree-based) operators may all be included in a pattern.

Pattern recognition language—a language used to guide a text processing system to find defined patterns of annotations. In its most common usage, a pattern recognition rule will test each constituent in some pattern for the presence or absence of one or more desired annotations (attributes). If the right combinations of annotations are found in the right order, the statement can then copy that text, add further annotations, or both, and return it to an application (that is, extract it) for further processing. Because linguistic relationships can involve constituents that are tree-structured or otherwise not necessarily sequentially ordered, a pattern recognition rule can also follow these types of relationships and not just sequentially arranged constituents.

Pattern recognition rule—a statement used to describe what text should be located by its pattern, and what should be done when such a pattern is found.

RAF—RuBIE application file.

RuBIE—Rule-Based Information Extraction language. The language in which the pattern recognition rules of the present invention are expressed.

RuBIE application file—a flat text file that contains one or more text pattern recognition rules and possibly other components of the RuBIE pattern recognition language. Typically it will contain all of the extraction rules associated with a single fact extraction application.

Rule-based pattern recognition—pattern recognition in which the pattern recognition rules are developed by a computational linguist or other pattern recognition specialist, usually through an iterative trial-and-error develop-evaluate process.

Shift—pattern recognition functionality that changes the location within a text where a pattern recognition rule is applying. Many pattern recognition languages have rules that process a text in left-to-right order. Shift functionality allows a rule to process a text in some other order, such as repositioning pattern recognition from mid-sentence to the start of a sentence, from a verb to its corresponding subject in mid-rule, or from any point to some other defined non-contiguous point.

Scope—the portion or sub-pattern of a pattern recognition rule that corresponds to an action. An action may act upon the text matched by the sub-pattern only if the entire pattern successfully matches some text.

Sub pattern—any pattern fragment that is less than or equal to a full pattern. Sub-patterns are relevant from the perspective of auxiliary definition statements and from the perspective of scopes of actions.

Tests—tests apply to constituents to verify either the value of a constituent or whether a particular attribute has been assigned to that constituent.

Text—in the context of a document search and retrieval application such as LexisNexis®, any string of printable characters, although in general a text is usually expected to be a document or document fragment that can be searched, retrieved and presented to customers using the online system. Web pages, customer documents, and natural language queries are other examples of possible texts.

Token—a minimal meaningful unit, such as an alphabetic string (word), space, punctuation symbol, number, and so on.

Token attributes—those attributes that are assigned to individual base tokens. Examples of token attributes may include the following: (1) part of speech tags, (2) literal values, (3) morphological roots, and (4) orthographic properties (e.g., capitalized, upper case, lower case strings).

Tokenize—to divide a text into a sequence of tokens.

Prior art pattern recognition languages and tools include lex, SRA's NetOwl® technology, and Perl™. These prior art pattern recognition languages and tools primarily exploit physical or orthographic characteristics of the text, such as alphabetic versus digit, capitalized vs. lower case, or specific literal values. Some of these also allow users to annotate pieces of text with attributes based on a lexical lookup process.

In the mid-1980s, the Mead Data Central (now LexisNexis) Advanced Technology & Research Group created a tool called the leveled parser. The leveled parser was an example of a regular expression-based pattern recognition language that used a lexical scanner to tokenize a text—that is, break the text up into its basic components ("base tokens"), such as words, spaces, punctuation symbols, numbers, document markup, etc.—and then use a combination of dictionary lookups and parser grammars to identify and annotate individual tokens and patterns of tokens of interest, based on attributes ("annotations" or "labels") assigned to those tokens through the scanner, parser or dictionary lookup (a base token and patterns of base tokens that share some common attribute are called "constituents").

For example, the lexical scanner might break the character string
  I saw Mr. Mark D. Benson go away.
into the annotated base token pattern:

| UC | LCS | CPS | PER | CPS | UC | PER | CPS | LCS | LCS | PER |
|---|---|---|---|---|---|---|---|---|---|---|
| I | saw | Mr | . | Mark | D | . | Benson | go | away | . |

(where UC = upper case letter, LCS = lower case string, CPS = capitalized string, PER = period).

A dictionary lookup may include a rule to assign the annotation TITLE to any of the following words and phrases: Mr, Mrs, Ms, Miss, Dr, Rev, President, etc. For the above example, this would result in the following annotated token sequence:

| UC | LCS | TITLE | PER | CPS | UC | PER | CPS | LCS | LCS | PER |
|---|---|---|---|---|---|---|---|---|---|---|
| I | saw | Mr | . | Mark | D | . | Benson | go | away | . |

A parser grammar was then used to find interesting tokens and token patterns and annotate them with an indication of their function in the text. The parser grammar rules were based on regular expression notation, a widely used approach to create rules that generally work from left to right through some text or sequence of annotated tokens, testing for the specified attributes.

For example, a regular expression rule to recognize people names in annotated text might look like the following:

(TITLE (PER)?)? (CPS | UCS) (UC (PER)? | CPS | UCS)? (CPS | UCS)

This rule first looks for TITLE attribute optionally ("?") followed by a period (PER), although the TITLE or TITLE-PERIOD is also optional. Then it looks for either a capitalized (CPS) OR upper case (UCS) string. It then looks for an upper case letter (UC) optionally followed by a period (PER), OR it looks for a capitalized string (CPS), OR it looks for an upper case string (UCS), although like the title, this portion of the rule is optional. Finally it looks for a capitalized (CPS) OR upper case (UCS) string.

This rule will find Mr. Mark D. Benson in the above example sentences. It will also find names like the following:

Mark Benson
Mark D Benson
Mark David Benson
Mr. Mark Benson

However, it will not find names like the following:

Mark
Benson
George H. W. Bush
e. e. cummings
Bill O'Reilly

Furthermore it will also incorrectly recognize a lot of other things as person names, such as StarWars in the following sentence:
  Mark saw Star Wars yesterday.

A grammar, whether a lexical scanner, leveled parser or any of the other conventional, expression-based pattern recognition languages and tools, may contain dozens, hundreds or even thousands of rules that are designed to work together for overall accuracy. Any one rule in the grammar may handle only a small fraction of the targeted patterns. Many rules typically are written to find what the user wants, although some rules in a grammar may primarily function to exclude some text patterns from other rules.

Regular expression-based pattern recognition works well for a number of pattern recognition problems in text. It is possible to achieve accuracy rates of 90%, 95% or higher for a number of interesting categories, such as company, people, organization and place names; addresses and address components; embedded numerics, such as times, dates, telephone numbers, weights, measures, and monetary amounts; and other tokens of interest such as case and statute citations, case names, social security numbers and other types of identification numbers, document markup, websites, e-mail addresses, and table components.

Regular expressions do have a problem recognizing some categories of tokens because there is little if any consistency in the structure of names in those categories, regardless of how many rules one might use. These include product names and names of books or other media, names that can be almost anything. There are also some language-specific issues that one runs into, for example: rules that recognize European language-based names in American English text often will stumble on names of Middle Eastern and Asian language origin; and rules developed to exploit capitalization patterns common in English language text may fail on languages with different capitalization patterns.

However, in spite of such problems, regular expression-based pattern recognition languages are widely used in a number of text processing applications across a number of languages.

What makes a text interesting is not that it contains just names, citations or other such special tokens, but that it also identifies the roles, functions, and attributes of those entities and their relationships with one another. These relationships are represented in text in any of a number of ways.

Consider the following sentences:

> John kissed Mary.
> Mary was kissed by John.
> John only kissed Mary.
> John kissed only Mary.
> John, that devil, kissed Mary.
> John kissed an unsuspecting Mary.
> John snuck up behind Mary and kissed her.
> Mary was minding her own business when John kissed her.

And yet for all of these sentences, the fundamental "who did what to whom" relationship is John (who) kissed (did what) Mary (to whom).

When trying to exploit sophisticated linguistic patterns, regular expression-based pattern recognition languages that progress from left to right through a sentence can enjoy some success even without any sophisticated linguistic annotations like agent or patient, but only for those cases where the attributes of interest are generally adjacent to one another, as in the first two example sentences above that use simple active voice or simple passive voice—and little else—to express the relationship between John and Mary.

But this approach to pattern recognition soon falls apart with the addition of any linguistic complexity to the sentence, such as adding a word like only or pronoun references like her.

A system that would attempt to find and annotate or extract who did what to whom in the above sentences would need at least two rather sophisticated linguistics processes:
  (1) The ability to identify and exploit agent-action-patient relationships in sentences or clauses (the reader may think of these in terms of subject-verb-object relationships, but agent-action-patient is more descriptive and useful given the existence of both active and passive sentences).
  (2) The ability to link coreferring expressions, such as her to Mary in the above sentences, and exploit those links.

This type of functionality is fundamentally beyond the scope of regular expression-based pattern recognition languages.

Orthographic attributes that are assigned to texts or text fragments are attributes whose assignment is based on attributes of the characters in the text, such as capitalization characteristics, letters versus digits, or the literal value of those characters.

Regular expression-based pattern recognition rules applied to the characters in a text are quite useful for tokenizing a text into its base tokens and assigning orthographic annotations to those tokens, such as capitalized string, upper case letter, punctuation symbol or space.

Regular expression-based pattern recognition rules applied to base tokens are quite useful for combining base tokens together into special tokens such as named entities, citations, and embedded numerics. These types of rules also assign orthographic annotations.

A dictionary lookup may be used to assign orthographic, semantic, and other annotations to a token or pattern of tokens. In an earlier example, a dictionary was used to assign the attribute TITLE to Mr. Some dictionary lookup processes at their heart rely on regular expression-based rules that apply to character strings, although there are other approaches to do this.

Semantic annotations can tell us that something is a person name or a potential title, but these types of annotations do not indicate the function of that person in a document. John may be a person name, but that does not tell us if John did the kissing or if he himself was kissed.

Linguists create parsers to help determine the natural language syntax of sentences, sentence fragments, and other texts. This syntax is both not only interesting in its own right for the linguistic annotations it provides, but also because it provides a basis for addressing ever more linguistically sophisticated problems. Identifying clauses, their syntactic subjects, verbs, and objects, and the various types of pronouns provides a basis for determining agents, actions, and patients in those clauses and for addressing some types of coreference resolution problems, particularly those involving linking pronouns to names and other nouns.

One typical characteristic of parser-based text annotations is that the annotations are usually represented by a tree or some other hierarchical representation. A tree is useful for representing both simple and rather complex syntactic relationships between tokens.

One such tree representation for JohnkissedMary is shown in FIG. 1.

Parse trees not only annotate a text with syntactic attributes like Noun Phrase or Verb, but through the relationships they represent, it is possible to derive additional grammatical roles as well as semantic functions. For example,
  A Noun Phrase found immediately under a Sentence node in such a tree may be annotated as the Grammatical Subject.
  Depending on its content and location relative to the verb, a Noun Phrase found immediately under a Verb Phrase may be annotated as the Grammatical Object.
  If the Verb in this Sentence is an active verb, then the Grammatical Object may be annotated with Patient as its semantic function. If the Verb is passive, then the Grammatical Subject may instead be annotated as the patient.

As sentences grow more complex, the process for annotating the text with these attributes also grows more complex—just as is seen with regular expression-based rule sets that target people names or other categories. But in general, many relationships between constituents of the tree can be defined by descriptions of their relative locations in the structure.

Through tokenization, dictionary lookups and parsing, it is possible for a part of the text to have many annotations assigned to it.

In the above sentence, the token Mary may be annotated with several attributes, such as the following:

> Literal value "Mary"
> Morphological root "Mary"
> Quantity Singular
> Capitalized String
> Alphabetic String
> Proper Noun
> Person Name
> Gender Female
> Noun Phrase
> Grammatical Object of Verb "Kiss"
> Patient of Verb "Kiss"
> Part of Verb Phrase "Kissed Mary"
> Part of Sentence "John Kissed Mary"

The tree representation of FIG. 1 can capture all of these attributes, as shown in FIG. 2.

The hierarchical relationships represented by a tree can be represented through other means. One common way is to represent the hierarchy through the use of nested parentheses. A notation like X(Y), for example, could be used to annotate whatever Y is with the structural attribute X. Using the above example, ProperNoun (John) indicates that John is a constituent under Proper Noun in the tree. Using this notation, the whole sentence would look like the following:

> Sentence( NounPhrase( ProperNoun( John ) ),
> VerbPhrase( Verb( kissed ), NounPhrase( ProperNoun( Mary ) ) ) )

Often with this type of representation, the hierarchy can be made more apparent through the use of new lines and indentation, as the following shows:

> Sentence(
>   NounPhrase(
>     ProperNoun(
>       John ) ),
>     VerbPhrase(
>       Verb(
>         kissed ),
>       NounPhrase(
>         ProperNoun(
>           Mary ) ) ) )

The difference is purely cosmetic; the use of labels and parentheses is identical.

In computing, there are now a number of widely used approaches for annotating a text with hierarchy-based attributes. SGML, the Standard Generalized Markup Language, gained widespread usage in the early 1990s. HTML, the HyperText Markup Language, is based on SGML and is used to publish hypertext documents on the World Wide Web.

In 1998, XML, the Extensible Markup Language, was created. Since it was introduced in 1998, it has gained growing acceptance in a number of text representation problems, many of which are geared towards representing the content of some text—a document—in a way that makes it easy to format, package, and present that text in any of a number of ways. XML is increasingly being used as a basis for representing text that has been annotated for linguistic processing. It has also emerged as a widely used standard for defining specific markup languages for capturing and representing document structure, although it can be used for any structured content.

The structure of a news article may include the headline, byline, dateline, publisher, date, lead, and body, all of which fall under a document node. A tree representation of this structure might look as shown in FIG. 3.

Just as XML can be used to define a news document markup, it can be used to define the type of linguistic markup shown in the JohnkissedMary example above.

The notation for XML markup uses a label to mark the beginning and end of the annotated text. Where X (Y) is used above to represent annotating the text Y with the attribute X, XML uses the following, where <X> and </X> are XML tags that annotate text Y with X:

<X>Y</X>

The JohnkissedMary example would look like:

> <Sentence><NounPhrase><ProperNoun>John</ProperNoun>
> </NounPhrase><VerbPhrase><Verb>kissed</Verb>
> <NounPhrase><ProperNoun>Mary</ProperNoun>
> </NounPhrase></VerbPhrase></Sentence> or cosmetically printed as:

> <Sentence>
>   <NounPhrase>
>     <ProperNoun>
>       John
>     </ProperNoun>
>   </NounPhrase>
>   <VerbPhrase>
>     <Verb>
>       kissed
>     </Verb>
>     <NounPhrase>
>       <ProperNoun>
>         Mary
>       </ProperNoun>
>     </NounPhrase>
>   </VerbPhrase>
> </Sentence>

The elements of the XML representation correspond to the nodes in the tree representation here. And just as attributes can be added to the nodes in the tree, such as +Object, +Patient and Literal "Mary" were added to the tree in FIG. 2, attributes can be associated with XML elements. Attributes in XML provide additional information about the element or the contents of that element.

For example, it is possible to associate attributes with the Proper Noun element "Mary" found in the tree above in the following way in an XML element:

> <ProperNoun LITERAL="Mary" NUM="SINGULAR"
> ORTHO="CPS"
> TYPE="ALPHA" PERSON="True"
> GENDER="Female">Mary</ProperNoun>

In computational linguistics, trees are routinely used to represent both syntactic structure and attributes assigned to nodes in the tree. XML can be used to represent this same information.

Finding related entities/nodes in trees and identifying the relationships between them primarily rely on navigating the paths between these entities and using the information associated with the entities/nodes. For example, as discussed above, this information could be used to identify grammatical subjects, objects and the relationship (in that case the verb) between them.

Linguists historically have used programming languages like Lisp to create, annotate, analyze, and navigate tree representations of text. XPath is a language created to similarly navigate XML representations of texts.

XSL is a language for expressing stylesheets. An XML style sheet is a file that describes how to display an XML document of a given type.

XSL Transformations (XSLT) is a language for transforming XML documents, such as for generating an HTML web page from XML data.

XPath is a language used to identify particular parts of XML documents. XPath lets users write expressions that refer to elements and attributes. XPath indicates nodes in the tree by their position, relative position, type, content, and other criteria. XSLT uses XPath expressions to match and select specific elements in an XML document for output purposes or for further processing.

When linguistic trees are represented using XML-based markup, XPath and XPath-based functionality can serve as a basis for processing that representation much like linguists have historically used Lisp and Lisp-based functionality.

Most work in information extraction research with which the inventors are familiar has focused on systems where all of the component technologies were created or adapted to work together. Base token identification feeds into named entity recognition. Named entity recognition results feed into a part of speech tagger. Part of speech tagging results feed into a parser. All of these processes can make mistakes, but because each tool feeds its results into the next one and each tool generally assumes correct input, errors are often built on errors.

In contrast, where annotation processes come from multiple sources and are not originally designed to work together, they do not necessarily build off each other's mistakes. Instead, their mistakes can be in conflict with one another.

For example, a named entity recognizer that uses capitalization might incorrectly include the capitalized first word of a sentence as part of a name, whereas a part of speech tagger that relies heavily on term dictionaries may keep that first word separate. E.g.,

| Original text: | Did Bill | go to the store? |
| Named entity: | [ Person | ] |
| Part of Speech: | [AUX] [ProperNoun] | |

This can be an even bigger problem if two annotators conflict in their results at both the beginning and the end of the annotated text string. For example, for the text string A B C D E, assign tag X to A B C and Y to C D E as shown in FIG. 4. In an XML representation, one possible end result is:

<X> A B <Y> C </X> D E </Y>

For example, if a sentence mentions a college and its home state, " . . . University of Chicago, Illinois . . . . ", then overlapping annotations for Organization and City may result:

<Organization> University of <City> Chicago, </Organization> Illinois </City>

Well-formed XML has a strict hierarchical syntax. In XML, marked sub-pieces of text are permitted to be nested within one another, but their boundaries may not cross. That is, they may not have overlapping tags (HTML, the markup commonly used for web pages, does permit overlapping tags.) This typically is not a problem for most XML-based applications, because the text and their attributes are created through guidance from valid document type definitions (DTDs). Because it is possible to incorporate annotators that were not designed to some common DTD, annotators can produce conflicting attributes. For that reason the RuBIE annotation process needs a component that can combine independently-generated annotations into valid XML.

Further, our past experiences with prior pattern recognition tools showed a great deal of value for both the use of regular expressions and tree-traversal tools, depending on the application. Tools such as SRA NetOwl® Extractor, Inxight Thingfinder™, Perl™, and Mead Data Central's Leveled Parser all provide "linear" pattern recognition, and tools such as XSLT and XPath provide hierarchical tree-traversal. However, we did not find any pattern recognition tool that combined these, particularly in a way appropriate for XML-based document representations. The typical representation to which regular expressions usually apply do not have a tree structure, and thus is not generally conducive to tree traversal-based functionality. Whereas tree representations are natural candidates for tree traversal functionality, their structure is not generally supportive of regular expressions.

The Penn Tools, an information extraction research prototype developed by the University of Pennsylvania, combine strong regular expression-based pattern recognition functionality with what on the surface appeared to be some tree navigation functionality. However, in that tool, only a few interesting types of tree-based relationships were retained. These were translated into a positional, linear, non-tree representation so that their regular expression-based extraction language, Mother of Perl ("MOP"), could also apply to those relationships in its rules. The Penn Tools information extraction research prototype does not have the ability to exploit all of the available, tree-based relationships in combination with full regular expression-based pattern recognition.

It is to the solution of these and other objects to which the present invention is directed.

BRIEF SUMMARY OF THE INVENTION

It is therefore a primary object of the present invention to provide a fact extraction tool set that can extract targeted pieces of information from text using linguistic and pattern matching technologies, and in particular, text annotation and fact extraction.

It is another object of the present invention to provide a method for recognizing patterns in annotated text that exploits all tree-based relationships and provides full regular expression-based pattern recognition.

It is still another object of the present invention to provide a method that resolves conflicting, or crossed, annotation boundaries in annotations generated by independent, individual annotators to produce well-formed XML.

These and other objects are achieved by the provision of a fact extraction tool set ("FEX") that extracts targeted pieces of information from text using linguistic and pattern matching technologies, and in particular, text annotation and fact extraction. The tag uncrossing tool in accordance with the present invention resolves conflicting (crossed) annotation boundaries in an annotated text to produce well-formed XML from the results of the individual FEX Annotators.

The text annotation tool in accordance with the present invention includes assigning attributes to the parts of the text. These attributes may include tokenization, orthographic, text normalization, part of speech tags, sentence boundaries, parse trees, and syntactic, semantic, and pragmatic attribute tagging and other interesting attributes of the text.

The fact extraction tool set in accordance with the present invention takes a text passage such as a document, sentence, query, or any other text string, breaks it into its base tokens, and annotates those tokens and patterns of tokens with a number of orthographic, syntactic, semantic, pragmatic and dictionary-based attributes. XML is used as a basis for representing the annotated text.

Text annotation is accomplished by individual processes called "Annotators" that are controlled by FEX according to a user-defined "Annotation Configuration." FEX annotations are of three basic types. Expressed in terms of regular expressions, these are as follows: (1) token attributes, which have a one-per-base-token alignment, where for the attribute type represented, there is an attempt to assign an attribute value to each base token; (2) constituent attributes assigned yes-no values to patterns of base tokens, where the entire pattern is considered to be a single constituent with respect to some annotation value; and (3) links, which connect coreferring constituents such as names, their variants, and pronouns. FEX annotations are captured in a single representation of the document expressed as inline XML. In an XML representation, token attributes tend to be represented as XML attributes on base tokens, and constituent attributes and links tend to be represented as XML elements. Shifts tend to be represented as XPath expressions that utilize token attributes, constituent attributes, and links.

Within the Annotation Configuration, appropriate FEX Annotators are identified as well as any necessary parameters, input/output, dictionaries, or other relevant information. The annotation results of these FEX Annotators are stored individually.

The fact extraction tool set in accordance with the present invention focuses on identifying and extracting potentially interesting pieces of information in an annotated text by finding patterns in the attributes stored by the annotators. To find these patterns and extract the interesting facts, the user creates a RuBIE annotation file using a Rule-Based Information Extraction language ("the RuBIE pattern recognition language") to write pattern recognition and extraction rules. This file queries for literal text, attributes, or relationships found in the annotations. It is these queries that actually define the facts to be extracted. The RuBIE annotation file is compiled and applied to the aligned annotations generated in the previous steps.

Other objects, features, and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE INVENTION

Figure 1:
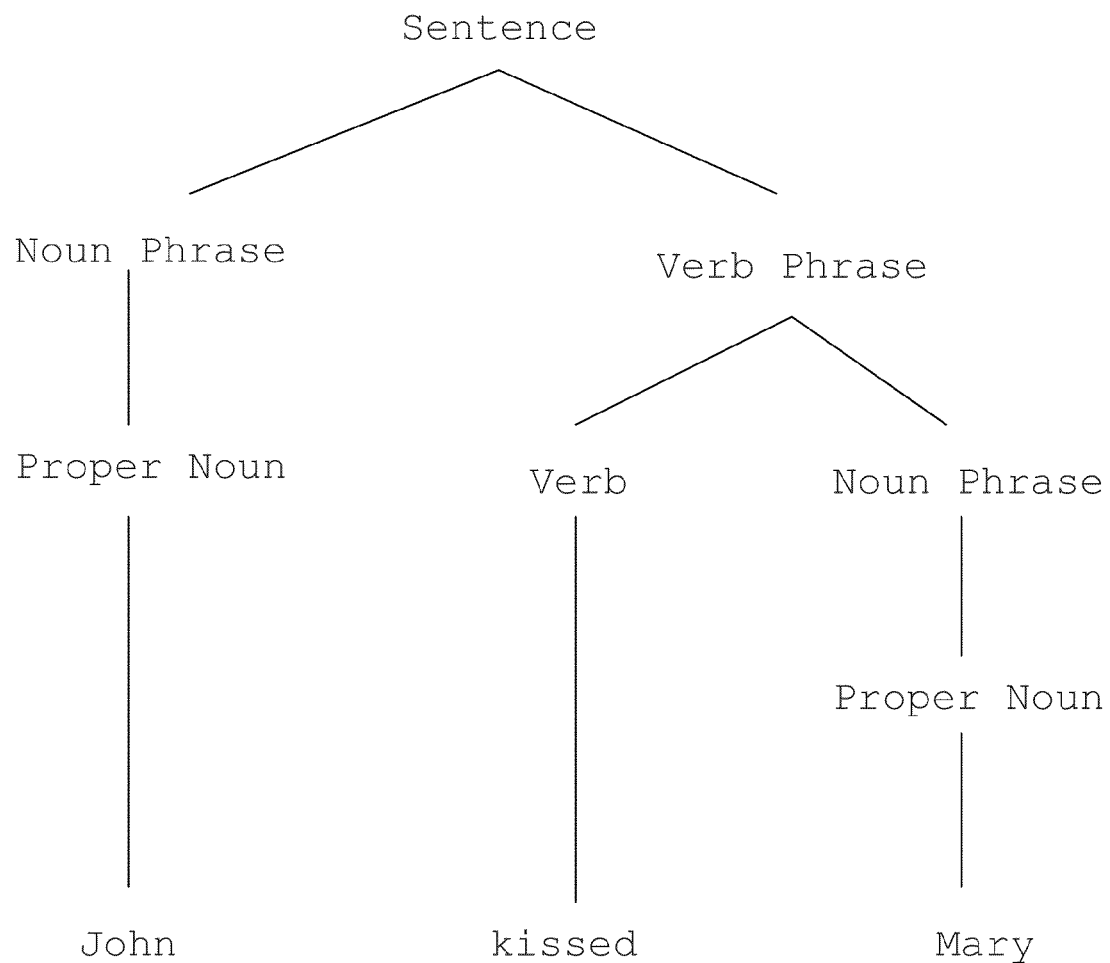
FIG. 1 is a tree representation for the phrase JohnkissedMary.
Figure 2:
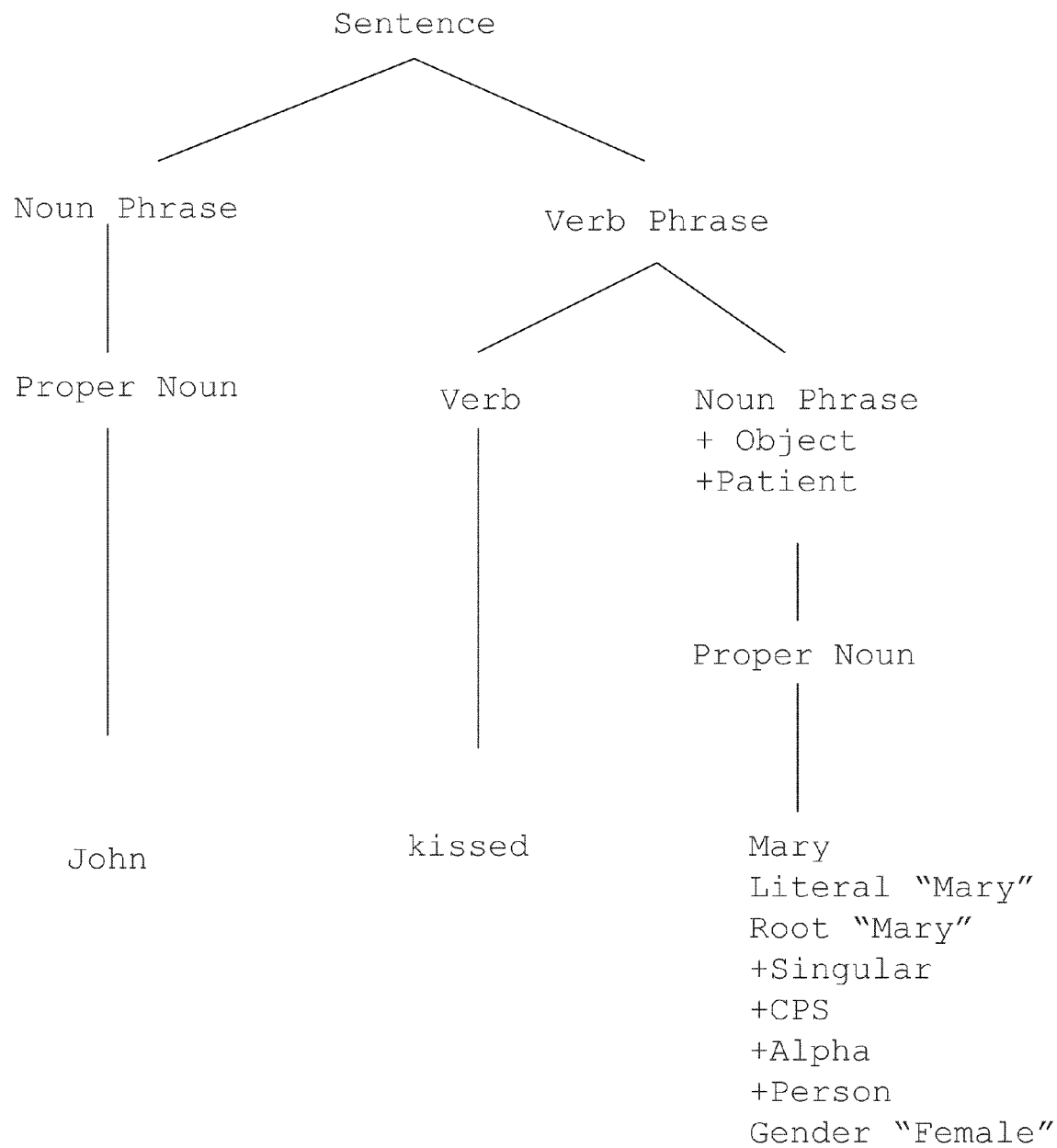
FIG. 2 is the tree representation of FIG. 1 with further annotations of the token Mary.
Figure 3:
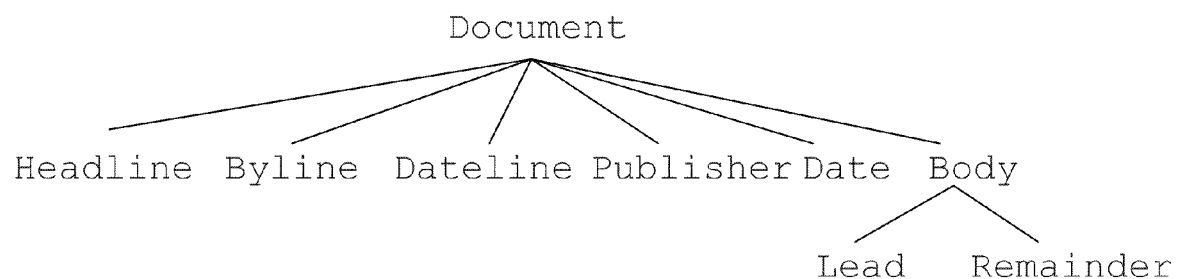
FIG. 3 shows a tree representation of the basic structure of a news article.
Figure 4:
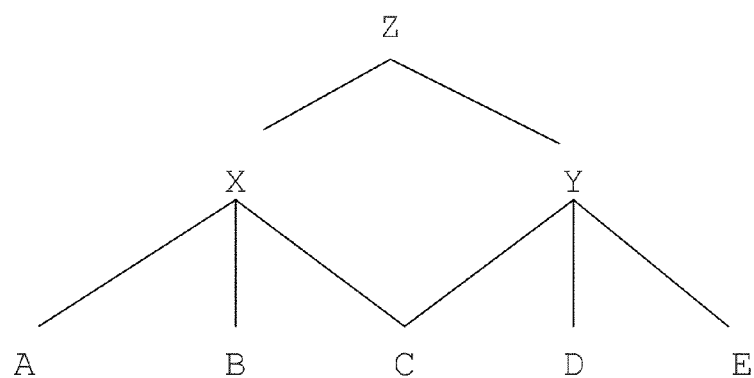
FIG. 4 shows the assignment of tags with conflicting boundaries (or nesting) to the text string A B C D E.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

The fact extraction ("FEX") tool set in accordance with the present invention extracts targeted pieces of information from text using linguistic and pattern matching technologies, and in particular, text annotation and fact extraction.

The text annotation process assigns attributes to a text passage such as a document, sentence, query, or any other text string, by parsing the text passage—breaking it into its base tokens and annotating those tokens and patterns of tokens with a number of orthographic, syntactic, semantic, pragmatic, and dictionary-based attributes. These attributes may include tokenization, text normalization, part of speech tags, sentence boundaries, parse trees, semantic attribute tagging and other interesting attributes of the text.

Text structure is usually defined or controlled by some type of markup language. In the FEX tool set, an annotated text is represented as a single representation of a document expressed as inline XML, the Extensible Markup Language. The FEX tool set includes a tag uncrossing process to resolve conflicting (crossed) annotation boundaries in an annotated text to produce well-formed XML from the results of the text annotation process prior to fact extraction.

XML was chosen to annotate text in the FEX tool set for two key properties:

XML's approach to marking up a text with tags (actually tag pairs, marking the beginning and the end of some part of the text—an element of the text) allows it to represent hierarchical information because elements can be nested inside other elements, including a document element (an element that contains the entire text). Some types of linguistic text processing—natural language parsing, in particular—create a tree-hierarchy-based representation of a text and its linguistic constituents, such as Noun Phrase, Verb Phrase, Prepositional Phrase or Subordinate Clause (somewhat akin to sentence diagramming of the type taught in high school English classes).

It is possible to annotate any element in an XML-based representation of a document with attributes. Many types of linguistic text processing assign attributes to words and tokens, patterns of tokens, linguistic constituents, sentences, and even entire documents, each of which can be represented as an element in an XML-based representation of a document.

The FEX Annotation Process includes the management of annotation configuration information, the actual running of the annotators, and the alignment of the resulting annotations.

In general, a text is annotated by first segmenting, or tokenizing, it into a sequence of minimal, meaningful text units called base tokens, which include words, numbers, punctuation symbols, and other basic test units. General examples of token attributes with which the FEX tool set can annotate the base tokens of a text include, but are not limited to part of speech tags, literal values, morphological roots, and orthographic properties (e.g., capitalized, upper case, lower case strings). More specifically, examples of these attributes include, but are not limited to:

(1) The literal value of the character string, e.g., string="mark";
(2) Capitalization-corrected literal value;
(3) Literal value regardless of capitalization;
(4) Specific part of speech, such as Noun, Verb, Article, Adjective, Adverb, Pronoun, etc.;
(5) Inflectional morphological root, e.g., match a noun regardless of whether it is singular or plural (root(dog) matches dog or dogs), or match a verb regardless of its form (e.g., root(go) matches go, goes, going, went, gone);
(6) Inflectional morphological attributes, e.g., test whether a noun is singular or plural, or test whether a verb agrees with the grammatical subject on first person, third person, etc.;
(7) Orthographic attributes, such as capitalized string, upper case letter, upper case string, lower case letter, lower case string, digit, digit string, punctuation symbol, white space, and other;
(8) Pragmatic features, such as those that can indicate whether a constituent is a direct quotation, conditional, subjunctive or hypothetical;
(9) Document region where the token is located, such as headline, byline, dateline, date, lead, body, table, and other;
(10) Positional information, including the token's relative position in a document by token count and by character count;
(11) The length of the token;
(12) Special token types such as company name, person name, organization name, city name, county name, state name, province name, country name, geographic region name, phone number, street address, zip code, monetary amount, and time;
(13) Syntactic constituent types such as sentence, clause, basal noun phrase, and maximal noun phrase;
(14) Syntactic roles such as subject, verb, verb group, direct object, negated constituent;
(15) Semantic roles such as agent, action, and patient;
(16) Noun phrase contains a number;
(17) Noun phrase is a person;
(18) Noun phrase is animate or inanimate; and
(19) The token simply is present.

After the text has been tokenized, attributes are assigned to it through one or more processes that apply to the tokenized text or to the raw text. Every base token has at least one attribute—its literal value. Most tokens will have numerous additional attributes. They may also be part of pattern of tokens that have one or more attributes. Depending on the linguistic sophistication of a particular extraction application, a token may have a few or a few dozen attributes assigned to it, directly or through its parents in the tree structure representation ("representation" referring here to the fact that what is stored on the computer is a representation of a tree structure). A constituent is a base token or pattern of base tokens to which an attribute has been assigned.

Once one or more attributes have been assigned to the base tokens or patterns of base tokens, tests are applied to the constituents to verify either the value of a constituent or whether a particular attribute has been assigned to that constituent. If a test is successful, the pattern recognition process consumes, or moves to a point just past, the corresponding underlying base tokens. Because the pattern recognition process can shift, or move, to different locations in a text, it is possible for a single pattern recognition rule to consume the same base tokens more than once.

Text annotation in accordance with the present invention is accomplished by individual processes called "Annotators" Annotators used by the FEX tool set ("the FEX Annotators") can include proprietary annotators (including base tokenizers or end-of-sentence recognition) as well as commercially-available products (e.g., Inxight's ThingFinder™ and LinguistX® are commercially available tools that support named entity and event recognition and classification, part of speech tagging, and other language processing functions). When developing an information extraction application, the user will determine which FEX Annotators should apply to the text. The FEX tool set allows the user to control the execution of the FEX Annotators through annotation configuration files, which are created and maintained by the user in a graphical user interface development environment (GUI-DE) provided by the FEX tool set. Within the annotation configuration files, the user lists the FEX Annotators that the user wishes to run on his or her files, any relevant parameters for each (like dictionary names or other customizable switches, input/output, or other relevant information). The user also determines the order in which the selected FEX Annotators run, since some FEX Annotators might depend on the output of others. The annotation results of these FEX Annotators are stored individually.

Based on the annotation configuration, the FEX tool set runs the chosen annotators against the input documents. Generally, the first FEX annotator that runs against the document text is the Base Tokenizer, which generates "base tokens." Other FEX Annotators may operate on these base tokens or may use the original document text when generating annotations.

Because the resulting annotations can take many forms and represent many different types of attributes, they must be "aligned" to the base tokens. Annotation alignment is the process of associating all annotations assigned to a particular piece of text with the base token(s) for that text.

XML requires well-formed documents to be "properly nested." When several annotation programs apply markup to a document independently they may cross each other's nodes, resulting in improperly nested markup. Consider the following Example (a):

Example (a)

```
<!DOCTYPE doc ><doc>
<SENTENCE> ssss
        <ADJP>
            jjjj
    <CLAUSE> cccc
        <NP> nnnn
            </ADJP>
        </NP>
    </CLAUSE>
</SENTENCE>
</doc>
```

√X indicates partial solubility in solvent;

In Example (a), the <ADJP> node "crosses" the <CLAUSE> and <NP> nodes, both of which begin inside of the <ADJP> node, but terminate outside of it (i.e., beyond </ADJP>). Such an improperly nested document cannot be processed by standard XML processors. The method by which the FEX tool set uncrosses such documents to a properly-nested structure, as shown in the following Example (b), will now be described.

Example (b)

```
<!DOCTYPE doc ><doc>
<SENTENCE> ssss
        <ADJP spid="adjp1">
            jjjj
        </ADJP>
    <CLAUSE> <ADJP spid="adjp1"> cccc
        </ADJP>
        <NP> <ADJP spid="adjp1"> nnnn
            </ADJP>
        </NP>
    </CLAUSE>
</SENTENCE>
</doc>
```

Step 1: Given a crossed XML document as in Example (a), convert contiguous character-sequences of the document to a Document Object Model (DOM) array of three object-types of contiguous document markup and content: START-TAGS, END-TAGs, and OTHER. Here START-TAGS and END-TAGS are markup defined by the XML standard, for example, <doc> is a START-TAG and </doc> is its corresponding END-TAG. START-TAGs and their matching END-TAGs are also assigned a NESTING-LEVEL such that a parent-node's NESTING-LEVEL is less than (or, alternatively, greater than) its desired children's NESTING-LEVEL. All other blocks of contiguous text, whether markup, white space, textual content, or CDATA are designated OTHER. For example, in one instantiation of this invention, Example (a) would be represented as follows:

```
(OTHER <!DOCTYPE doc >)
(START <doc> nesting-level='1')
(START <SENTENCE> nesting-level='2')
(OTHER ssss )
(START <ADJP> nesting-level='5')
(OTHER jjjj)
(START <CLAUSE> nesting-level='3')
(OTHER cccc)
(START <NP> nesting-level='4')
(OTHER nnnn)
(END </ADJP> nesting-level='5')
(END </NP>)
(END </CLAUSE> nesting-level='3')
(END </SENTENCE> nesting-level='2')
(END </doc> nesting-level='1')
```

Step 2: Set INDEX at the first element of the array and scan the array object-by-object by incrementing INDEX by 1 at each step.

Step 3: If the object at INDEX is a START-TAG, push a pointer to it onto an UNMATCHED-START-STACK (or, simply "the STACK"). Continue scanning.

Step 4: If the current object is an END-TAG, compare it to the START-TAG (referenced) at Top of the STACK ("TOS").

Step 5: If the current END-TAG matches the START-TAG at TOS, pop the STACK. For example, the END-TAG "</doc>" matches the START-TAG "<doc>." Continue scanning with the DOM element that follows the current END-TAG.

Step 6: If the current END-TAG does not match the START-TAG at TOS, then

Step 7: If the NESTING-LEVEL of the START-TAG at TOS is less than the NESTING-LEVEL of the END-TAG at INDEX, we are at a position like the following:

```
           (OTHER <!DOCTYPE doc >)
           (START <doc> nesting-level='1')
           (START <SENTENCE> nesting-level='2')
           (OTHER ssss )
           (START <ADJP> nesting-level='5')
           (OTHER jjjj)
           (START <CLAUSE> nesting-level='3')
           (OTHER cccc)
TOS-->     (START <NP> nesting-level='4')
           (OTHER nnnn)
INDEX -->  (END </ADJP> nesting-level='5')
           (END </NP>)
           (END </CLAUSE> nesting-level='3')
           (END </SENTENCE> nesting-level='2')
           (END </doc> nesting-level='1')
```

This is the PRE-RECURSION position. If the END-TAG at INDEX does not have a SPID, assign it SPID='1'. Create a split-element start tag (SPLART-TAG) matching the END-TAG at INDEX. Insert the new SPLART-TAG above TOS. Copy the END-TAG at INDEX immediately below TOS, incrementing its SPID. Now recursively apply Step 6, with INDEX set below the old TOS and TOS popped, as in the continuing example:

```
           (OTHER <!DOCTYPE doc >)
           (START <doc> nesting-level='1')
           (START <SENTENCE> nesting-level='2')
           (OTHER ssss )
           (START <ADJP> nesting-level='5')
           (OTHER jjjj)
TOS-->     (START <CLAUSE> nesting-level='3')
           (OTHER cccc)
INDEX-->   (END </ADJP> nesting-level='5' SPID='2')
```

This process will recur until TOS and INDEX match, as in the continuing example:

```
          (OTHER <!DOCTYPE doc >)
          (START <doc> nesting-level='1')
          (START <SENTENCE> nesting-level='2')
          (OTHER ssss )
TOS-->    (START <ADJP> nesting-level='5')
          (OTHER jjjj)
INDEX-->  (END </ADJP> nesting-level='5' SPID='3')
```

At this point the START-TAG at TOS is assigned the SPID of the (matching) END-TAG at INDEX, and the recursion unwinds to the PRE-RECURSION POSITION, as in the continuing example:

```
          (OTHER <!DOCTYPE doc>)
          (START <doc> nesting-level='1')
          (START <SENTENCE> nesting-level='2')
          (OTHER ssss )
          (START <ADJP> nesting-level='5' SPID='3')
          (OTHER jjjj)
          (END </ADJP> nesting-level='5' SPID='3')
          (START <CLAUSE> nesting-level='3')
          (START <ADJP> nesting-level='5' SPID='2')
          (OTHER cccc)
          (END </ADJP> nesting-level='5' SPID='2')
TOS-->    (START <NP> nesting-level='4')
          (START <ADJP> nesting-level='5' SPID='1')
          (OTHER nnnn)
INDEX --> (END </ADJP> nesting-level='5' SPID='1')
          (END </NP>)
          (END </CLAUSE> nesting-level='3')
          (END </SENTENCE> nesting-level='2')
          (END </doc> nesting-level='1')
```

Now INDEX is incremented and scanning of the array resumes at Step 3. Note than the SPLART-ELEMENTS added during recursion are not on STACK.

Step 8: If the nesting level of the START-TAG at TOS is greater than or equal to the NESTING-LEVEL of the END-TAG at INDEX, we are at a position like the following:

```
          (OTHER <!DOCTYPE doc >)
          (START <doc> nesting-level='5')
          (START <SENTENCE> nesting-level='4')
          (OTHER ssss )
          (START <ADJP> nesting-level='1')
          (OTHER jjjj)
          (START <CLAUSE> nesting-level='3')
          (OTHER cccc)
TOS-->    (START <NP> nesting-level='2')
          (OTHER nnnn)
INDEX--> (END </ADJP> nesting-level='1')
          (END </NP>)
          (END </CLAUSE> nesting-level='3')
          (END </SENTENCE> nesting-level='4')
          (END </doc> nesting-level='5')
```

In this case we create a SPLART-TAG at TOS, and insert a copy after INDEX with SPID incremented, and a matching END-TAG before INDEX. We then pop the STACK, arriving at the following exemplary position.

```
          (OTHER <!DOCTYPE doc >)
          (START <doc> nesting-level='5')
          (START <SENTENCE> nesting-level='4')
          (OTHER ssss )
          (START <ADJP> nesting-level='1')
          (OTHER jjjj)
TOS-->    (START <CLAUSE> nesting-level='3')
          (OTHER cccc)
          (START <NP> nesting-level='2' SPID='1')
          (OTHER nnnn)
          (END </NP>)
INDEX--> (END </ADJP> nesting-level='1')
          (START <NP> nesting-level='2' SPID='2')
          (END </NP>)
       (END </CLAUSE> nesting-level='3')
          (END </SENTENCE> nesting-level='4')
          (END </doc> nesting-level='5')
```

Once again, the NESTING-LEVEL of the START-TAG at TOS is greater than the NESTING-LEVEL at INDEX, so step 8 is repeated until the START-TAG at TOS match, at which point the method continues from Step 3.

Step 9: If the PRIORITY of the START-TAG at TOS is greater than the PRIORITY of the current END-TAG, set the variable INCREMENT to 1. Recursively descend the START-STACK until a START-TAG is found which matches to the current END-TAG. Create a SPLART-TAG from this START-TAG, as in Step 7, and replace the START-TAG in the DOM at the index of the START-TAG at TOS with this (current) SPLART-TAG.

Step 10: Unwind the STACK, and at each successive TOS, insert a copy of the current END-TAG into the array before the array index of the START-TAG at TOS. Add INCREMENT to the array index of the START-TAG at TOS. If INCREMENT is equal to 1, set it to 2. Insert a copy of SPLART-TAG into the DOM after the index of the START-TAG at TOS and continue unwinding the STACK at Step 10.

Step 11: Resume scanning after the current END-TAG at Step 2.

Those skilled in the art will understand that the DOM, which in the above description is implemented as an array, may also be implemented as a string (with arrays or stacks of index pointers), as a linked-list, or other data structure without diminishing the generality of the method in accordance with the present invention. Likewise, the number, names, and types of elements represented in the DOM may also be changed without departing from the principles of the present invention. Similarly, the recursive techniques and SPID numbering conventions used in the preceding example were chosen for clarity of exposition. Those skilled in the art will understand that they can be replaced with non-recursive techniques and non-sequential reference identification without departing from the principles of the present invention. Finally it will be noted that this algorithm generates a number of "empty nodes", for example, nodes of the general form <np spid="xx"></np>, which contain no content. These may be left in the document, removed from the document by a post-process, or removed during the operation of the above method without departing from the principles of the method in accordance with the present invention. Those skilled in the art will understand further that the method described here in terms of XML can also be applied to any other markup language, data structure, or method in which marked segments of data must be properly-nested in order to be processed by any of the large class of processes which presume and require proper nesting.

The fact extraction process in accordance with the present invention will now be described. Fact extraction focuses on identifying and extracting potentially interesting pieces of information in an annotated text by finding patterns in the attributes stored by the FEX annotators. To find these patterns and extract the interesting facts from the aligned annotations, the user creates a file in the GUI-DE using a Rule-Based Information Extraction language ("the FEX RuBIE pattern recognition language"). This file ("the RuBIE application file") comprises a set of instructions for extracting pieces of text from some text file. The RuBIE application file can also comprise comments and blanks. The instructions are at the heart of a RuBIE-based extraction application, while the comments and blanks are useful for helping organize and present these instructions in a readable way.

The instructions in the RuBIE application file are represented in RuBIE in two different types of rules or statements, (1) a pattern recognition rule or statement, and (2) an auxiliary definition statement. A RuBIE pattern recognition rule is used to describe what text should be located by its pattern, and what should be done when such a pattern is found.

RuBIE application files are flat text files that can be created and edited using a text editor. The RuBIE pattern recognition language is not limited to the basic 26-letter Roman alphabet, but at least minimally also supports characters found in major European languages, thus enabling it to be used in a multilingual context.

Ideally, RuBIE application files can contain any number of rules and other components of the RuBIE pattern recognition language. They can support any number of comments and any amount of white space, within size limits of the text editor. Any limits on scale are due to text editor size restrictions or operational performance considerations.

A RuBIE pattern recognition rule comprises three components: (1) a pattern that describes the text of interest, perhaps in context, (2) a label that names the pattern for testing and debugging purposes; and (3) an action that indicates what should be done in response to a successful match.

A pattern is a regular expression-like description of a number of base tokens or other constituents that should be recognized in some way, where the recognition of the tokens is primarily driven by targeted attributes that have been assigned to the text through annotation processes. One or more annotation value tests, zero or more recognition shifts, and zero or more regular expression operators may all be included in a pattern.

Only one label may be assigned to a pattern. Exemplary syntax used to capture the functionality of the RuBIE pattern recognition language is set forth in Tables 1 through 14. The notation in Tables 1 through 14 is exemplary only, it being understood that other notation could be designed by those of skill in the art. In the examples used herein, a RuBIE pattern recognition rule begins with a label and ends with a semicolon (;).

TABLE 1

Binary Operators

| Exemplary syntax | Functionality |
|---|---|
| BOP = & | logical AND |
| BOP = \| | logical OR |
| BOP = <space> | is followed by a.k.a. concatenation |

TABLE 2

Unary Pre-operators

| Exemplary syntax | Functionality |
|---|---|
| UOPre = – | complement |

TABLE 3

Unary Post-operators

| Exemplary syntax | Functionality |
|---|---|
| UOPost = * | zero closure |
| UOPost = + | positive closure |
| UOPost = {m,n} | repetition range specification |

TABLE 4

Shifts

| Exemplary syntax | Functionality |
|---|---|
| Shift = govtov | verb group to start of verb group |
| Shift = gonton | noun phrase to start of noun phrase |
| Shift = govtos | verb group to start of subject |
| Shift = gostov | subject to start of verb group |
| Shift = govtoo | verb group to start of object |
| Shift = gootov | object to start of verb group |
| Shift = gosntov | sentence to start of verb group |
| Shift = goctov | clause to start of verb group |
| Shift = goleftn | left n tokens |
| Shift = gorightn | right n tokens |
| Shift = retest | leftmost base token tested |
| Shift = redo | leftmost base token in scope just matched |
| Shift = gosns | start of current sentence |
| Shift = gosne | end of current sentence |
| Shift = gonpton | noun phrase to start of head noun |
| Shift = corefa | start of next coreferring basal noun phrase |
| Shift = corefc | start of preceding coreferring basal noun phrase |

TABLE 5

Constituent Attribute Tests

| Exemplary syntax | Functionality |
|---|---|
| T = present | placeholder for when any token will do |
| T = Company | company name |
| T = Person | person name |
| T = Organization | organization name |
| T = City | city name |
| T = County | county name |
| T = State | state name |
| T = Region | region name |
| T = Country | country name |
| T = Phone | phone number |
| T = Address | street address or address fragment |
| T = Zipcode | zip code |
| T = Case | case citation |
| T = Statute | statute citation |
| T = Money | monetary amounts |
| T = BasalNP | basal noun phrase |
| T = MaxNP | maximal noun phrase |
| T = Time | time amount |
| T = NPNum | basal noun phrase that contains a number |
| T = Subject | subject |
| T = VerbGp | verb group |
| T = DirObj | direct object |
| T = Negated | negated |
| T = Sentence | sentence |
| T = Paragraph | paragraph |

TABLE 5-continued

Constituent Attribute Tests

| Exemplary syntax | Functionality |
|---|---|
| T = EOF | end of file, a.k.a. end of text input |
| T = attribute | attributes assigned using a system or user-defined phrase dictionary, where attribute is some attribute defined by the system or dictionary |

TABLE 6

Constituent Attribute Tests for Syntactically-related Constituents

%T(s), where T is any T from the above list, and s is any s from a list of possible syntactically-related constituents.

TABLE 7

Token Attribute Tests

| Exemplary syntax | Functionality |
|---|---|
| T(v) = literal | case-sensitive form of the base token string |
| T(v) = word | case-insensitive form of the base token string |
| T(v) = token | base level token orthographic attribute |
| T(v) = POS | part of speech tag |
| T(v) = root | inflectional morphological root |
| T(v) = morphfeat | inflectional morphology attributes |
| T(v) = morphdfeat | derivational morphology attributes |
| T(v) = space | representation of white space following the token in the original text |
| T(v) = region | segment name or region in the document |
| T(v) = tokennum | sequential number of token in text |
| T(v) = startchar | position of token's first character |
| T(v) = endchar | position of token's last character |
| T(v) = length | character length of token |
| T(v) = DocID | document identification number that includes the current base token |
| T(v) = attribute | attributes assigned using a system or user-defined word dictionary |

TABLE 8

Token attribute Test Values

| Exemplary syntax | Functionality |
|---|---|
| v = value | specific character string or numeric value |
| v = >value | greater than the specified character string or numeric value |
| v = >=value | greater than or equal to the specified character string or numeric value |
| v = <=value | less than or equal to the specified character string or numeric value |
| v = <value | less than the specified character string or numeric value |
| v = value..value | greater than or equal to the first character string or numeric value, and less than or equal to the second character string or numeric value, where the second value is greater than or equal to the first value |
| v = −value | not the character string or numeric value |

TABLE 9

Auxiliary Definition Patterns

| Exemplary syntax | Functionality |
|---|---|
| <AUXPAT> = T | constituent attribute test |
| <AUXPAT> = T(v) | token attribute test, single value |
| <AUXPAT> = T(v, . . . ,v) | token attribute test, multiple values |
| <AUXPAT> = ( <AUXPAT> ) | grouping a sub-pattern for an operator) |
| <AUXPAT> = <AUXPAT> BOP <AUXPAT> | using binary operators in patterns |
| <AUXPAT> = UOPre <AUXPAT> | using unary pre-operators in patterns |
| <AUXPAT> = <AUXPAT> UOPost | using unary post-operators in patterns |

TABLE 10

Labels

| Exemplary syntax | Functionality |
|---|---|
| LABEL | unique_alphanumeric_string |

TABLE 11

Auxiliary Definitions

| Exemplary syntax | Functionality |
|---|---|
| <AUXDEF> = <LABEL>: <AUXPAT> | define an aux pattern and giving it a unique label |

TABLE 12

Basic Patterns for Pattern recognition rules

| Exemplary syntax | Functionality |
|---|---|
| P = T | constituent attribute test |
| P = %T(s) | constituent attribute test on a specified, syntactically-related constituent |
| P = T(v) | token attribute test, single value |
| P = T(v, . . . ,v) | token attribute test, multiple values |
| P = <LABEL> | using an auxiliary definition |
| P = ( P ) | grouping a sub-pattern for an operator |
| P = P BOP P | using binary operators in patterns |
| P = UOPre P | using unary pre-operators in patterns |
| P = P UOPost | using unary post-operators in patterns |
| P = P shift+ P | using shifts in patterns |

TABLE 13

Actions

| Exemplary syntax | Functionality |
|---|---|
| A = #match(operands) | extract the text and return name and attributes |
| A = #matchS(operands) | extract sentence that contains the text and return name and attributes |
| A = #matchP(operands) | extract paragraph that contains the text and return name and attributes |
| A = #matchn(operands) | extract the text and surrounding n tokens on both sides |
| A = #return(message, . . . ) | return the message(s) when text is matched |
| A = #return(format, message, . . . ) | return the message(s) when text is matched, formatted as indicated |

TABLE 13-continued

Actions

| Exemplary syntax | Functionality |
| --- | --- |
| A = #block | hide the matched text from all other pattern recognition rules |
| A = #blockS | hide the sentences that include the matched text from all other pattern recognition rules |
| A = #blockP | hide the paragraphs that include the matched text from all other pattern recognition rules |
| A = #blockD | hide the documents that include the matched text from all other pattern recognition rules |
| A = #musthaveS | only process sentences matched by the corresponding pattern or scope |
| A = #musthaveP | only process paragraphs matched by the corresponding pattern or scope |
| A = #musthaveD | only process documents matched by the corresponding pattern or scope |

TABLE 14

Pattern recognition rules with Labels (L), Patterns (P) and Actions (A)

| Exemplary syntax | Functionality |
| --- | --- |
| #LABEL: P A+ | the scope of the actions is the entire pattern |
| #LABEL: [ P ] A+ | the scope of the actions is the explicitly delineated entire pattern |
| #LABEL: ( P* [ P ] A+ )+ P* | actions are associated with one or more explicitly delineated sub-patterns |

One or more actions may be associated with a pattern or with one or more specified sub-patterns in the pattern. Generally, a sub-pattern is any pattern fragment that is less than or equal to a full pattern. An auxiliary definition statement is used to name and define a sub-pattern for use elsewhere. This named sub-pattern may then be used in any number of recognition statements located in the same RuBIE application file. Auxiliary definitions provide convenient shorthand for sub-patterns that may be used in several different patterns.

Although a single pattern may match several base tokens, whether sequential or otherwise related, the user may only be interested in one or more subsets of the matched tokens. The larger pattern provides context for the smaller pattern of interest. For example, in a text aaabbbccc the user may want to match bbb every time that it appears, only when it follows aaa, only when it precedes ccc, or only when it follows aaa and precedes ccc.

When the entire pattern can be matched regardless of context, the full pattern—as specified—is used to match a specific piece of text of interest. However, when only part of the pattern is of interest for recognition purposes and the rest is only provided for context, then it must be possible to mark off the interesting sub-pattern. In the following example, square brackets ([ ]) are used to do this. Thus, a pattern that tries to find bbb only when it follows aaa might look something like aaa [bbb]

Recognition shifts can significantly impact the text that actually corresponds to a bracketed sub-pattern. Because shifts do not actually recognize tokens, shifts at the start or end of a bracketed sub-pattern do not alter the tokens that are included in the bracket. In other words, aaa govtos [bbb]
and
aaa [govtos bbb]

would perform the same way, identifying bbb.

However, because a piece of extracted text must be a sequence of adjacent base tokens, a shift can result in non-specified text being matched. For example, given a piece of text aaabbbcccdddeeefffggg the pattern aaa [bbb goright2 eee] fff will match bbb ccc ddd eee whereas the pattern aaa [bbb] goright2 [eee] fff will match bbb and eee separately.

A pattern must adhere to the following requirements:

(1) It is possible for a pattern to have one or more annotation tests.
(2) It is possible for a pattern to have zero or more shifts.
(3) A shift is preceded and followed by annotation tests.
(4) It is possible for a pattern to have sequences of two or more annotation tests.
(5) It is possible to identify a sequence of annotation tests and shifts that are to be treated as one item with respect to some operator. In many regular expression languages, parentheses are used to group such sequences.
(6) It is possible to test a constituent for any one of a list of attribute values for an individual annotation test. A list of values can be used for some tests, e.g., test (value, . . . , value), but this format is not a requirement.
(7) It is possible to test a constituent for any of one or more different annotation tests. In the examples used herein, a vertical bar is used, e.g., test (value)|test (value), but this format is not a requirement.
(8) It is possible to test a constituent for all of one or more different annotations. In the examples used herein, the ampersand is used, e.g., test (value) & test (value), but this format is not a requirement. (The annotation tests will typically represent different annotations since an annotation attribute generally has a single value for a given token.)
(9) It is possible to complement a test. In the examples used herein, the hyphen is used, e.g., -test (value) and test (-value), but this format is not a requirement.
(10) It is possible to complement a set of tests. In the examples used herein, the hyphen is used, e.g., -(test (value)|test (value)), but this format is not a requirement.
(11) It is possible to specify that a pattern or part of a pattern be repeated zero or more times (zero closure). In the examples herein, the asterisk is used, e.g., test (value)*, but this notation is not a requirement.
(12) It is possible to specify that a pattern or part of a pattern be repeated one or more times (positive closure). In the examples herein, the plus sign is used, e.g., test (value)+, but this notation is not a requirement.
(13) It is possible to specify that a pattern or part of a pattern be optional. In the examples herein, the question mark is used, e.g., test (value)?, but this notation is not a requirement.
(14) It is possible to specify that a pattern or part of a pattern be repeated at least m times and no more than n times, where m must be greater than or equal to zero, n must be greater than or equal to one, and n must be greater than or equal to m. In the examples herein, braces are used, e.g., test (value) {m,n}, but this notation is not a requirement.

(15) In general, patterns must process text from left to right, except when shifts direct the pattern recognition process to other parts of the text.
(16) It is possible to use an entire pattern to define a piece of text to extract. In this case, the entire pattern represents the scope of some action or actions.
(17) It is possible to define one or more sub-patterns that define pieces of text to extract. In this case, each sub-pattern represents the scope of some corresponding action or actions. Square brackets are used herein to mark sub-patterns, but this notation is not a requirement.
(18) If a sub-pattern is specified, no action can have the entire pattern in its scope.
(19) No token can be included in the scope of more than one action unless the actions share the same scope (no overlapping or nesting of sub-patterns are allowed).
(20) An action must follow the patterns relevant to that action.

A label is an alphanumeric string that uniquely identifies a pattern recognition rule or auxiliary definition. As the name of a RuBIE pattern recognition rule, a label supports debugging, because the name can be passed to the calling program when the corresponding pattern matches some piece of text. As the name of an auxiliary definition, a label can be used in a pattern to represent a sub-pattern that has been defined. Auxiliary definitions are a convenience for when the same sub-pattern is used repeatedly in one or more patterns.

A label that is associated with some pattern may look something like this:

```
<person>:   ( word("mr", "ms", "mrs") literal(".")? )?
token(capstring, capinitial){1,4}
#officer:   <person> literal(",")? jobtitle
```

The auxiliary definition <person> may consist of a title word optionally followed by a period, although this sequence is optional. It is then followed by one to four capitalized words or strings. The #officer pattern recognition rule uses the <person> label to represent the definition of a person, followed by an optional comma and then followed by a job title to identify and extract a reference to a corporate officer. Thus, there is a distinction between this sample auxiliary definition "<person>" and the "Person" constituent attribute test as found in Table 5.

The requirements for labels are as follows:
(1) Each pattern recognition rule must have a unique label that distinguishes it from all other pattern recognition rules. In the examples herein, #alphanumeric: is used as a pattern label, but this format is not a requirement.
(2) Each auxiliary definition must have a unique label that distinguishes the auxiliary definition from all other auxiliary definitions. In the examples used herein, <alphanumeric>: is used as an auxiliary definition label, but this format is not a requirement.
(3) It is possible to use an auxiliary definition label, excluding the colon, in a pattern recognition rule to represent a sub-pattern as defined by the auxiliary definition pattern.

An action is an instruction to the RuBIE pattern recognition language concerning what to do with some matched text. Typically the user will want RuBIE to return the matched piece of text and some attributes of that text so that the calling application can process it further. However, the user may want to return other information or context in some cases. A selection of actions gives the user increased flexibility in what the user does when text is matched.

Each action has a scope, where the scope is the pattern or clearly delineated sub-pattern that when matched correctly to some piece of text, the action will apply to that piece of text. Each pattern recognition rule must have at least one action (otherwise, there would be no reason for having the statement in the first place). A statement may in fact have more than one action associated with it, each with a sub-pattern that defines its scope. More than one action may share the same scope, that is, the successful recognition of some piece of text may result in executing more than one action. For any given RuBIE pattern recognition rule, individual parts of the rule may successfully match attributes assigned to some text. However, actions will only be triggered when the entire rule is successful, even if the scope of the action is limited only to a subset of the rule. For this reason, if the entire pattern recognition rule successfully matches some pattern of text attributes, all associated actions will be triggered, if any part of the rule fails, none of its associated actions will be triggered.

The requirements for actions are as follows:
(1) The entire pattern must match before any actions associated with scopes in that pattern are triggered.
(2) There is a #match action that labels and returns a piece of text matched by some pattern or sub-pattern that falls within the scope of the #match action. The specific #match notation is used herein for example purposes, but it is not a requirement.
(3) A pair of markers around some sub-pattern that has a corresponding #match action defines the scope of that #match action. Square brackets are used herein for example purposes, but this notation is not a requirement.
(4) If no sub-pattern within a pattern is delimited by a pair of markers, the entire pattern is within the scope of the corresponding #match action.
(5) A #match action must take one or more operands.
(6) A #match action must specify a category name or some user-defined text to describe the matched text.
(7) A #match action must specify a list of zero or more annotation types. For each matched pattern, corresponding annotation values are returned for each annotation tag in the specified list.

Suppose for example that #match (operand, . . . , operand) is used to represent a #match action. Suppose also that POS is the part of speech annotation tag and root is the morphological root annotation tag. Then something like
match (victim, POS, root)
could return the extracted text with the label victim, followed by the part of speech for each base token in the extracted text, followed by the morphological root for each base token in the extracted text.
(8) The #matchS action is the same as the #match action, except that #matchS returns text associated with the smallest sequence of one or more sentences that include the matched text ("context sentences").
(9) The #matchP action is the same as the #match action, except that #matchP returns the text associated with the smallest sequence of one or more paragraphs that include the matched text. ("context paragraphs").
(10) The #matchn action, where n is an unsigned positive integer, is the same as the #match action, except that #matchn returns the matched text and the text associated with up to n base tokens on either side of the matched text if those tokens are available. ("context tokens").

(11) The # return action provides a means for the application to return one or more messages when a successful match occurs, where the operands are the messages to return.

Suppose for example that #return (message) is used to represent a #match action. It would then be possible to provide the calling program with a return code or "normalized" text, as in the pattern

[ literal("schnauzer", "poodle") ]
return("Found a dog.")

returning the text "Found a dog." every time it finds literal values schnauzer or poodle.

(12) The scope of a #return action is defined the same way as the scope of a #match action.

(13) The # return action allows formatted strings to be returned. For example, if the first operand is a "format string", i.e., contains placeholders for string substitution, then the following operands must be text strings for substitution into the format string at the respective placeholder locations.

(14) The #return action allows an explicit destination file. For example, if the placeholders in the format string look like "% s" and $1 and $2 represent the patterns matched respectively, a #return (format, message, . . . ) action might look like:

[ Person ] root("sue") [ Person ] #return("%s sued %s", $1, $2)

returning some text like "JohnSmithsuedBobJohnson".

(15) The #block action provides the application with a means to "hide" a piece of text from other pattern recognition rules. Text that is matched within the scope of a #block action may not be matched by any other pattern recognition rule. It is noted that this creates an exception to the general principle that all recognition statements can apply to all the text ("block text").

(16) The scope of a #block action is defined the same way as the scope of a #match action.

(17) The #blockS action provides the application with a means to "hide" a piece of text from other pattern recognition rules. Sentences that include text that is matched within the scope of a #blockS action may not be matched by any other pattern recognition rule. It is noted that this creates an exception to the general principle that all recognition statements can apply to all the text ("block sentences").

(18) The scope of a #blockS action is defined the same way as the scope of a #match action.

(19) The #blockP action provides the application with a means to "hide" a piece of text from other pattern recognition rules. Paragraphs that include text that is matched within the scope of a #blockP action may not be matched by any other pattern recognition rule. It is noted that this creates an exception to the general principle that all recognition statements can apply to all the text ("block paragraphs").

(20) The scope of a #blockP action is defined the same way as the scope of a #match action.

(21) The #blockD action provides the application with a means to "hide" a piece of text from other pattern recognition rules. A document that contains text that is matched within the scope of a #blockD action may not be matched by any other pattern recognition rule. This effectively hides the entire document from all other pattern recognition rules in a RuBIE application file. It is noted that this creates an exception to the general principle that all recognition statements can apply to all the text ("block document").

(22) The scope of a #blockD action is defined the same way as the scope of a #match action.

(23) The #musthaveS action provides the application with a means to "hide" a piece of text from other pattern recognition rules. Only those sentences within a document that contain text that is matched within the scope of a #musthaveS action may be processed by other pattern recognition rules. It is noted that this creates an exception to the general principle that all recognition statements can apply to all the text ("sentence must have").

(24) The scope of a #musthaveS action is defined the same way as the scope of a #match action.

(25) The #musthaveP action provides the application with a means to "hide" a piece of text from other pattern recognition rules. Only those paragraphs within a document that contain text that is matched within the scope of a #musthaveP action may be processed by other pattern recognition rules. It is noted that this creates an exception to the general principle that all recognition statements can apply to all the text ("paragraph must have").

(26) The scope of a #musthaveP action is defined the same way as the scope of a #match action.

(27) The #musthaveD action provides the application with a means to "hide" a piece of text from other pattern recognition rules. Only those documents that contain text that is matched within the scope of a #musthaveD action may be processed by other pattern recognition rules. If an application file includes a #musthaveD action that has not been triggered for some document, no other patterns in the RuBIE application file may find anything in that document. It is noted that this creates an exception to the general principle that all recognition rules can apply to all the text ("document must have").

(28) The scope of a #musthaveD action is defined the same way as the scope of a #match action.

An auxiliary definition provides a shorthand notation for writing and maintaining a sub-pattern that will be used multiple times in the pattern recognition rules. It is somewhat analogous to macros in some programming languages.

Auxiliary definitions are a convenience for when the same sub-pattern is used repeatedly in one or more pattern recognition rules. Repeating an example that was used earlier, note how the auxiliary definition label <person> is used in the pattern recognition rule labeled #officer:

<person>:   ( word("mr", "ms", "mrs") literal(".")? )? token(capstring, capinitial){1,4}
officer:   <person> literal(",")? jobtitle The auxiliary definition label may be used repeatedly in one or more pattern recognition rules.

The requirements for auxiliary definition statements are as follows:

(1) An auxiliary definition must consist of a uniquely labeled pattern.
(2) Shifts are not permitted in auxiliary definitions.
(3) Actions are not permitted in auxiliary definitions.

(4) Because actions are not permitted in auxiliary definitions, sub-pattern scopes cannot be delineated in auxiliary definitions.

(5) Except for the exclusions noted in the above requirements, an auxiliary pattern must have all of the same characteristics of a pattern in a pattern recognition rule.

In a preferred embodiment, application-specific dictionaries in the RuBIE pattern recognition language can be separate annotators. Alternatively, lexical entries can be provided in the same file in which pattern recognition rules are defined. In this alternative embodiment, the RuBIE application file has syntax for defining lexical entries within the file. One advantages of this alternative embodiment is that there is a clear relationship between the dictionaries and the applications that use them. Also, there is greater focus on application-specific development work on RuBIE Application Files. However, large word and phrase lists can make RuBIE application files difficult to read. Also, the alternative embodiment does not promote the idea of shared or common dictionaries.

In general, a free order among the patterns and auxiliary definitions may be assumed. All patterns generally apply simultaneously. However, there are two general recognition order requirements, as follows:

(1) For #block actions to have any meaning, recognition statements with #block actions must apply before other recognition statements.

(2) If two recognition statements match overlapping text, both recognition statements must apply, except when recognition is prohibited for other reasons, such as #block, #musthave, and so on.

As noted above, RuBIE-based application files may vary from a few pattern recognition rules to hundreds or even thousands of rules. Individual rules may be rather simple, or they may be quite complex. Clear, well-organized and well-presented RAFs make applications easier to develop and maintain. The RuBIE pattern recognition language provides users with the flexibility to organize their RAFs their own way in support of producing RAFs in a style that is most appropriate for the application and its maintenance.

The format requirements for RuBIE pattern recognition rules are as follows:

(1) There is not a one-to-one relationship between RuBIE pattern recognition rules and lines in a RuBIE application file. A single statement may span multiple lines.

(2) White space may be used for formatting purposes anywhere in between the components that make up a RuBIE pattern recognition rule and in between RuBIE pattern recognition rules themselves. Because literal values are considered single components, a white space in a literal value is considered literal space character and not white space used for formatting purposes.

(3) Any line may be blank or consist only of spaces.

(4) There are no column restrictions in a RuBIE application file (as required in some technical languages).

(5) It is possible to specify comments in a RuBIE application file.

Because the Fact Extraction Tool Set has API interfaces, ownership of input annotated text, output extraction results and output report files is the responsibility of the invoking program and not the RuBIE application file. When a statement successfully identifies and extracts a piece of text, the RAF needs to communicate those results.

The fact extraction application that applies a RuBIE application file against some annotated text routinely has access to some standard results. Also, it optionally has access to all the annotations that supported the extraction process.

The input and output requirements for the RuBIE pattern recognition language are as follows:

(1) When an extraction successfully matches a piece of text for extraction purposes, it provides the calling program with (1) the name of the rule, (2) the extracted text, (3) the start and end token numbers matched, and (4) any message generated by actions in the rule.

(2) One pattern recognition rule may extract more than one piece of text. This is why each piece of extracted information must contain some type of label, in addition to the name of the statement.

(3) Because one pattern recognition rule may extract more than one piece of text, it must also provide the calling program with a total extent. The total extent is a token range from the earliest (leftmost) token that a statement recognizes to the latest (rightmost) token that the statement recognizes for each piece of extracted text.

(4) The user may identify zero or more types of annotations to be reported for output purposes. For each annotation specified, the attributes for that annotation and the tokens or token sequences that they annotate are also returned or made accessible in some other way to the calling program.

(5) For debugging purposes, there is a switch that allows the user to write extraction results and related information to a browsable report file for viewing and analysis purposes.

Other functionalities implemented by the RuBIE pattern recognition language are as follows:

(1) Users may insert new annotation processes at will without the need for software changes to the RuBIE pattern recognition language to accommodate the additional annotation types and values that are introduced. For this reason, new annotation processes must provide access to their annotations in a way that is consistent with the various requirements of the RuBIE pattern recognition language. All annotation processes must provide their names and acceptable values (including digit ranges where appropriate) to the process that compiles or processes a RAF.

(2) Users do not have to use all of the annotations available to them in a given application.

At the user's request, the FEX server (described in greater detail hereinafter) compiles the RuBIE application file and runs it against the aligned annotations to extract facts.

The RuBIE pattern recognition language is a pattern recognition language that applies to text that has been tokenized into its base tokens—words, numbers, punctuation symbols, formatting information, etc.—and annotated with a number of attributes that indicate the form, function, and semantic role of individual tokens, patterns of tokens, and related tokens. Text structure is usually defined or controlled by some type of markup language; that is the RuBIE pattern recognition language applies to one or more sets of annotations that have been captured in a single XML-based representation of the document and aligned with a piece of tokenized text.

Although text annotation in accordance with the present invention uses XML as a basis for representing the annotated text, the RuBIE pattern recognition language itself places no restrictions on the markup language used in the source text because the RuBIE pattern recognition language actually applies to sets of annotations that have been aligned with the base tokens of the text rather than directly to the source text itself. The RuBIE pattern recognition language is rule-based, as opposed to machine learning-based.

The RuBIE pattern recognition language can exploit any attributes with which a text representation has been annotated. Through a dictionary lookup process, a user can create new attributes specific to some application. For example, in an executive changes extraction application that targets corporate executive change information in business news stories, a dictionary may be used to assign the attribute ExecutivePosition to any of a number of job titles, such as President, CEO, Vice President of Marketing, Senior Director and Partner. A RuBIE pattern recognition rule can then simply use the attribute name rather than list all of the possible job titles.

For the sentence

Mark Benson read a book.

the tokens Mark and Benson may each be annotated with orthographic attributes indicating their form (e.g., alphabetic string and capitalized string). The sequence Mark Benson may further be annotated with attributes such as proper name, noun phrase, person, male, subject, and agent. The individual terms may also be annotated with positional information attributes (1 for Mark and 2 for Benson), indicating their relative position within a sentence, document or other text.

An application that targets corporate executive change information in business news stories may have rules that attempt to identify each of the following pieces of information in news stories that have been categorized as being relevant to the topic of executive changes:

(1) The executive position in question
(2) The type of change(s) that occurred in that position (e.g., hired, fired, resigned, retired, etc.)
(3) The person or persons affected by the executive change (the old or new person in the position)
(4) The name of the company, subsidiary or division where the change took place
(5) The date of the change
(6) Related comments from a company spokesperson The semantic agent of a "retired" action (the person performs the action of retiring) or the semantic patient of a "hired" or "fired" action (the person's executive status changes because someone else performs the action of hiring or firing them) is likely the person affected by the change. It may take multiple rules to capture all of the appropriate executives based on all the possible action-semantic role combinations possible. That is why a RuBIE application file may include many rules for a single application.

Other possible extraction applications could include the following:

(1) Identify the buyer, the target, friendly vs. hostile, and the amount of money and stock involved in a corporate acquisition
(2) Identify a weather event, where it occurred, how many people were injured or killed, and the amount of damage done
(3) For a story about a terrorist attack, identify where the attack occurred, the type of attack, how many people were injured or killed, information on the damage done, and who claimed responsibility
(4) Identify the name of the company, revenues, earnings or losses, and the time periods for which the figures apply.

Information extraction applications can be developed for any topic area where information about the topic is explicitly stated in the text.

A pattern recognition language used as a basis for applications that apply to text fundamentally tests the tokens and constituents in that text for their values or attributes in some combination. In some applications, the attributes are limited to little more than orthographic attributes of the text, e.g., What is the literal value of a token? Is it an alphabetic string, a digit string or a punctuation symbol? Is the string capitalized, upper case or lower case? And so on.

Many pattern recognition languages rely on a regular expression-based description of the attribute patterns that should be matched. Typically, the simplest example of a regular expression in annotated text processing is a rule that tests for the presence of a single attribute or the complement of that attribute assigned to some part of the text, such as a base token. More complex regular expressions look for some combination of tests, such as sequences of different tests, choices between multiple tests, or optional tests among required tests. Regular expression-based pattern recognition processes often progress left-to-right through the text. Some regular expression-based pattern recognition languages will have additional criteria for selecting between two pattern recognition rules that each could match the same text, such as the rule listed first in the rule set has priority, or the rule that matches the longest amount of text has priority. Regular expression-based pattern recognition languages are often implemented using finite state machines, which are highly efficient for text processing.

A number of applications, especially in identifying many categories of named entities, can be highly successful even with such limited annotations. The LexisNexis® LEXCITE® case citation recognition process, SRA's NetOwl® technology and Inxight's ThingFinder™ all rely on this level of annotation in combination with the use of dictionaries that assign attributes based on literal values (e.g., LEXCITE® uses a dictionary of case reporter abbreviations; named entity recognition processes such as NetOwl® and ThingFinder™ commonly use dictionaries of company cues such as Inc, Corp, Co, and PLC, people titles such as Mr, Dr, and Jr, and place names).

Similar to prior art regular expression-based pattern recognition tools like SRA's NetOwl® technology, Perl™, and the Penn Tools, the RuBIE pattern recognition language supports common, regular expression-based functionality. However, the results of more sophisticated linguistics processes that annotate a text with syntactic attributes are best represented using a tree-based representation. XML has emerged as a popular standard for creating a representation of a text that captures its structure. As noted above, the FEX tool set uses XML as a basis for annotating text with numerous attributes, including linguistic structure and other linguistic attributes, combining these in a single XML-based representation of the annotated document.

The relationship between two elements in the tree-based representation can be determined by following the path through the tree between the two elements. Some important relationships can easily be anticipated—finding the subject and object (or agent and patient) of some verb, for example. Because sentences can come in an infinite variety, there can be an infinite number of possible ways to specify the relationships between all possible entity pairs. The RuBIE pattern recognition language exploits some of the more popular syntactic relationships common to texts.

In the approach taken by the Penn Tools, a predefined set of specific shift operators based on those relationships was included in the language. However, that approach limited users to only those relationships that were predefined. The RuBIE pattern recognition language avoids similar restrictions. XPath provides a means for traversing the tree-like hierarchy represented by XML document markup. It is possible to create predefined functions and operators for popular relationships based on XPath as part of the RuBIE pattern recognition language, both as part of the RuBIE language and through application-specific auxiliary definitions, but it is also possible to give RuBIE pattern recognition rule writers direct access to XPath so that they can create information extraction rules based on any syntactic relationship that could be represented in XML. Thus a RuBIE pattern recognition rule can combine traditional regular expression pattern recognition functionality with the ability to exploit any syntactic relationship that can be expressed using XPath.

The RuBIE pattern recognition language is unique in its combination of traditional regular expression pattern recognition capabilities and XPath-based tree traversal capabilities, in addition to providing matching patterns in an annotated text to support information extraction.

The RuBIE pattern recognition language allows users to combine attribute tests together using traditional regular expression functionality and XPath's ability to traverse XML-based tree representations. Through the addition of macro-like auxiliary definitions, the RuBIE pattern recognition language also allows users to create application-specific matching functions based on regular expressions or XPath.

A single RuBIE pattern recognition rule can use traditional regular expression functionality, XPath-based functionality, and auxiliary definitions in any combination. The pattern recognition functionality that is deployed as part of the FEX tool set for tests, regular expression-based operators, and shift operators will now be described.

A test verifies that a token or constituent:
(1) Has the presence of an attribute
(2) Has the presence of an attribute that has a particular value
(3) Has the presence of an attribute that has one of a set of possible values
If the test is successful, the corresponding text has been match.

A RuBIE pattern recognition rule contains a single test or a combination of tests connected by RuBIE operators (a combination of regular expression and tree traversal functionality). If the test or combination of tests are all successful within the logic of the operators used, then the rule has matched the text that correspond to the tokens or constituents, and that text can be extracted or processed further in other ways.

Regular expression-based operators in the RuBIE pattern recognition language include the following:
(1) Apply a single test to a single token or constituent;
(2) Apply a sequence of tests to a pattern of tokens or constituents;
(3) Create a test by putting a valid sequence of tests in parentheses.
(4) Either of two tests must be true (logical OR);
(5) Both of two tests must be true (logical AND);
(6) Use the complement of the result of the test (logical NOT);
(7) Apply a test to a sequence of zero or more tokens or constituents (zero closure);
(8) Apply a test to a sequence of one or more tokens or constituents (positive closure);
(9) Indicate that a test is optional; and
(10) Apply a test to a sequence of at least m and no more than n tokens or constituents.

Shift operators rely on syntactic and other hierarchical information such as that which can be gained from traversing the results of a parse tree. XML is used to capture this hierarchical information, and XPath is used as a basis for the following tree traversal operators:
(1) From within a noun phrase to the start of the noun phrase
(2) From within a verb group to the start of the verb group
(3) From within a subject to the start of its corresponding verb group
(4) From within a verb group to the start of its corresponding subject
(5) From within an object to the start of the verb group that governs it
(6) From within a sentence to the start of its verb group
(7) From within a clause to the start of its verb group
(8) From within a sentence to the start of that sentence
(9) From within a sentence to the end of that sentence
(10) From within a noun phrase to the start of its head noun
(11) From within a noun phrase to the start of the next co-referring noun phrase
(12) From within a noun phrase to the start of the previous co-referring noun phrase There are many other similar relationships that can be captured in the RuBIE pattern recognition language's XML-based representation. Through direct use and programming macro-like auxiliary definitions, the RuBIE pattern recognition language allows users to create additional and new shift operations based on XPath in order to exploit any of a number of relationships between constituents as captured in the XML-based representation of the annotated text.

The RuBIE pattern recognition language also has shift operators based on relative position, including
(1) Go left some number of base tokens
(2) Go right some number of base tokens
(3) Go to the leftmost base token most recently matched by the application of the rule (allows a second test starting from the same position)

Because in the RuBIE pattern recognition language, the same attribute values may be used with different annotations (e.g., the word dog may have dog as its literal form, its capitalization normalized form and its morphological root form), and because the user may introduce new annotation types to an application, it is necessary to specifying both the annotation type and annotation value in RuBIE pattern recognition rules.

The RuBIE pattern recognition language allows a user to test a base token for the following attributes:
(1) An attribution, which includes a specific annotation type and corresponding annotation value.
(2) Any of a number of annotation values that correspond to a single specified annotation type. It is possible to do this at least two different ways. The preferred way is to allow the user to list multiple values in a single test. Another approach requires that the user OR together each individual annotation value test.
(3) One or more case sensitive literal values. Because this involves individual tokens, a literal phrase test involves testing the literal values of a sequence of individual tokens. It is possible to specify literals in at least two ways, such as literal (word) and "word."
(4) One or more case-corrected values. Because this involves individual tokens, a literal phrase test involves testing the literal values of a sequence of individual tokens.
(5) One or more case insensitive literal values. Because this involves individual tokens, a literal phrase test involves testing the literal values of a sequence of individual tokens.
(6) One or more part of speech tag values.
(7) One or more inflectional morphological root values.
(8) One or more inflectional morphological attribute values.
(9) One or more derivational morphological attribute values.
(10) One or more orthographic attributes, such as capitalized string, upper case letter, upper case string, lower case letter, lower case string, digit, digit string, punctuation symbol, white space, and other.

(11) Information about the white space that follows the token in the original text (in the case where white space base tokens are eliminated from the base token stream, and information about those tokens is attached as attributes of the tokens that precede them). These attributes may include followed by white space and not followed by white space (e.g., followed by punctuation or markup language tags). White space that precedes all base tokens in the source text may be ignored, or designers may consider introducing start-of-document and end-of-document base tokens.

(12) The region of the document in which it appears. As used herein, regions generally correspond to segment functions. For news data, regions may include headline, byline, dateline, date, lead (non-table), body (non-lead, non-table), table (in lead or body), company (index term segment), and other.

(13) Token number in the sequence of tokens that comprise the input text. Annotation values consist of integer strings, as tokens are numbered from 1 to n (or 0 to n−1). This permits a recognition rule to return the attribute value to the calling program.

(14) Starting character position in the input text. Annotation values consist of integer strings, as characters are numbered from 1 to n (or 0 to n−1). This permits a recognition rule to return the attribute value to the calling program.

(15) Ending character position in the input text. Annotation values consist of integer strings, as characters are numbered from 1 to n (or 0 to n−1). This permits a recognition rule to return the attribute value to the calling program.

(16) Length in characters. This permits a recognition rule to return the attribute value to the calling program.

(17) The current document identification. This permits a recognition rule to return the attribute value to the calling program so that the system can report which document a recognition occurred in when processing collections of multiple documents.

(18) Arithmetic ranges of values, such as >n, >=n, =n, <n, <=n, m. n, and −=n, when testing an annotation type that has a numerical value.

When specifying literal values, users are able to indicate wildcard characters (.), superuniversal truncation (!), and optional characters (?). A wildcard character can match any character. Superuniversal truncation means that the term must match exactly anything up to the superuniversal operator, and then anything after that operator is assumed to match by default. An optional character is simply a character that is not relevant to a particular test, e.g., word-final -s for some nouns.

Constituent attributes are those attributes that are assigned to a pattern of one or more base tokens that represent a single constituent. A proper name, a basal noun phrase, a direct object and other common linguistic attributes can consist of one or more base tokens, but RuBIE pattern recognition rules treat such a pattern as a single constituent. If for example the name MarkDavidBenson has been identified as a proper name AND a noun phrase AND a subject, simply specifying one of these attributes in some statement would result in the matching of all three base tokens that comprise the constituent.

The emphasis for constituent attributes is on recognizing valid constituents. Examples of constituent attributes include, but are not limited to, the following: Company; Person; Organization; Place; Job Title; Citation; Monetary Amount; Basal Noun Phrase; Maximal Noun Phrase; Verb Group; Verb Phrase; Subject; Verb; Object; Employment Change Action Description Term; and Election Activity Descriptive Term (MDW—just making the fonts and notation we use for attributes more consistent). In some instances, the "pattern" may consist of a single base token. The RuBIE pattern recognition language has the ability to recognize non-contiguous (i.e., tree-structured) constituents via XPath in addition to the true left-right sequences on which the regular expression component of the RuBIE pattern recognition language focuses.

Annotations are defined and assigned robustly by the RuBIE pattern recognition language. No sort of taxonomical inheritance is assumed; otherwise a pattern recognition rule would have to draw information from sources in addition to the XML-based annotation representation.

In most respects, a constituent attribute generally behaves like a token attribute in patterns. The RuBIE pattern recognition language includes the following constituent attributes:

(1) The RuBIE pattern recognition allows the user to identify some patterns of tokens as single constituents that consist of one or more sequential tokens.

(2) The RuBIE pattern recognition allows annotations to be assigned to constituents.

(3) When a pattern token is identified in a recognition pattern, it is treated as a single constituent regardless of how many base tokens comprise it.

(4) The RuBIE pattern recognition allows the user to test a constituent for a specific annotation type.

(5) Base tokens may be part of more than one constituent.

(6) Two constituents that have at least one base token in common do not necessarily have to have all base tokens in common (7) It is possible to test a constituent for a company name annotation type.

(8) It is possible to test a constituent for a person name annotation type.

(9) It is possible to test a constituent for an organization name annotation type.

(10) It is possible to test a constituent for a city name annotation type.

(11) It is possible to test a constituent for a county name annotation type.

(12) It is possible to test a constituent for a state or province name annotation type.

(13) It is possible to test a constituent for a geographic region name annotation type.

(14) It is possible to test a constituent for a country name annotation type.

(15) It is possible to test a constituent for a phone number annotation type.

(16) It is possible to test a constituent for a street address annotation type.

(17) It is possible to test a constituent for a zip code annotation type.

(18) It is possible to test a constituent for a case citation annotation type.

(19) It is possible to test a constituent for a statute citation annotation type.

(20) It is possible to test a constituent for a money amount annotation type.

(21) It is possible to test a constituent for a sentence annotation type.

(22) It is possible to test a constituent for a clause annotation type.

(23) It is possible to test a constituent for a paragraph annotation type.

(24) It is possible to test a constituent for a basal noun phrase annotation type.
(25) It is possible to test a constituent for a maximal noun phrase annotation type.
(26) It is possible to test a constituent for a time annotation type.
(27) It is possible to test a constituent for a noun phrase "Has Number" annotation type.
(28) It is possible to test a constituent for a subject annotation type.
(29) It is possible to test a constituent for a verb group annotation type.
(30) It is possible to test a constituent for a direct object annotation type.
(31) It is possible to test a constituent for a negated annotation type.
(32) It is possible to test a constituent for a person attribute.
(33) It is possible to test a constituent for an animate (living thing, perhaps at one time) attribute.
(34) It is possible to test a constituent for an inanimate attribute.
(35) It is possible to test for the presence of a token regardless of its other annotations. All tokens can be treated as if they have a "present" attribute.
(36) It is possible to introduce new constituent-based annotation type tests through general annotators.
(37) It is possible to introduce new constituent-based annotation type tests through one or more dictionaries.

Regular expressions are powerful tools for identifying patterns in text when all of the necessary information is located sequentially in the text. Natural language, however, does not always cooperate. A subject and its corresponding object may be separated by a verb. A pronoun and the person it refers to may be separated by paragraphs of text. And yet it is these relationships that are often the more interesting ones from a fact extraction perspective.

There are a number of approaches for storing relationship information. One common approach uses a direct link between the related items. Adding a common identifier to both related items is another way of accomplishing this. The Penn Tools used this to support shifts from one location to the start of a related constituent; this was accomplished using positional triples that identified the beginning and end positions of the starting point constituent and the position immediately in front of the related token to which pattern recognition was to shift. From anywhere in a verb phrase, for example, one can shift the recognition process to a point just before the main verb in that phrase. From the subject, one can shift the recognition process to a point just before the start of the corresponding verb group.

In the RuBIE pattern recognition language, the pattern recognition process can be shifted directly between two related constituents. The RuBIE pattern recognition language supports the following relationship shifts:

(1) It is possible to shift recognition from anywhere within a noun phrase to the start of the noun phrase.
(2) It is possible to shift recognition from anywhere within a verb group to the start of the verb group.
(3) It is possible to shift recognition from anywhere within a subject to the start of the verb group that governs the subject.
(4) It is possible to shift recognition from anywhere within a verb group to the start of the subject governed by that verb group.
(5) It is possible to shift recognition from anywhere within a verb group to the start of the object governed by that verb group.
(6) It is possible to shift recognition from anywhere within an object to the start of the verb group that governs the object.
(7) It is possible to shift recognition from anywhere within a sentence to the start of the governing verb group.
(8) It is possible to shift recognition from anywhere within a linguistic clause to the start of the verb group that governs that clause.
(9) It is possible to shift recognition from anywhere within a text to the left by some specified number of base tokens, except when there are not enough tokens to the left.
(10) It is possible to shift recognition from anywhere within a text to the right by some specified number of base tokens, except when there are not enough tokens to the right.
(11) It is possible to shift recognition from anywhere within a text to the start of the leftmost base token matched by the most recent test in a pattern recognition rule. This allows the same text to be retested for some other annotation or pattern of annotations. For example, after verifying that the subject is represented by a noun phrase, one might then want to test its components to extract any adjectives as descriptors.
(12) It is possible to shift recognition from anywhere within a text to the start of the leftmost base token matched by the most recent scope as indicated by brackets in the examples in this report. This allows the same piece of text to be matched more than once, perhaps to return different attributes with it.
(13) It is possible to shift recognition from anywhere within a sentence to the start of that sentence.
(14) It is possible to shift recognition from anywhere within a sentence to the end of that sentence.
(15) It is possible to shift recognition from anywhere within a noun phrase to the start of the head noun in that noun phrase.
(16) It is possible to shift recognition from anywhere within a basal noun phrase to the start of the next (right) coreferring noun phrase.
(17) It is possible to shift recognition from anywhere within a basal noun phrase to the start of the previous (left) coreferring noun phrase.
(18) Users may add new annotations that define other relationships between two constituents. It is possible to define functionality that moves the recognition process from within one of these constituents to the start of the other constituent, allowing for the introduction of new shifts.

For those shifts dependent on parse tree-based syntactic relationships—such as shifts between subjects, verbs, and objects in a sentence or clause—the adopted shift command takes arguments, specifically references to constituent objects. Due to the nature of language, there can often be more than one possible constituent that may fit the prose description of the shift. For example, consider the sentence JohnkissedMaryanddatedSue. There are two verbs here, each with one subject (John in both cases) and one object (Mary and Sue respectively). This type of complexity adds some ambiguity, e.g. deciding which verb to shift to. The ability to use indirection and compound constituent objects addresses this class of problems.

The RuBIE pattern recognition language therefore also include the following capabilities:

(19) It is possible to pass references to constituents to RuBIE patterns.

(20) It is possible to pass references to compound constituent objects to RuBIE patterns (e.g., linking the subject "John" to both verbs "kissed" and "dated"—not just the first verb—in the example above).

(21) It is possible to access the elements and relationships found in a full parse tree.

The RuBIE shifts allow a RuBIE pattern recognition rule writer to shift the path of pattern recognition from one part of a text to another. For many of the shifts, however, there is a corresponding shift to return the path of pattern recognition back to where it was before the first shift occurred. A variation of the constituent attribute test could account for a number of cases where such shift-backs are likely to occur. The RuBIE pattern recognition language therefore also includes the following capabilities:

(22) It is possible to test a syntactically related constituent for the presence of an attribute without shifting the path of pattern recognition back and forth.

This might be realized with a test that, for constituent attributes, looks like:

% sequence-attribute-test(parse-tree-locatable-entity)
as in
% company (antecedent-of-pronoun)
or for token attributes:
% sequence-attribute-test(v, parse-tree-locatable-entity)
as in
% root("kill", verb-of-subject)

where the percent sign is simply an arbitrarily selected character that indicates the type of test that follows.

(23) It is possible to test a syntactically related constituent recursively for the presence of an attribute without shifting the path of pattern recognition back and forth ("nested tests").

Following is a walkthrough of an example RuBIE pattern recognition rule that identifies a new hire and his or her new job position as expressed in a passive sentence. In this case, the new hire is a person who is the patient of a hire verb.

The sentences targeted by the example rule are:
John Smith was hired as CEO of IBM Corp.
IBM announced that John Smith was appointed CEO.

The example production RuBIE pattern recognition rule using an alternate syntax, named PassiveFact1, is as follows:

```
PassiveFact1:
    @hireverb
    ( @goUp(CLAUSE)atEl("CLAUSE","passive=t")
    goFromTo("CLAUSE","pat","*","id")
    <NewHire>@goDN(PERSON)</NewHire>)
    @goDN(T)
    <Position>atEl("*","n-
    type=position")</Position>
```

The rule first looks for a "hire" verb. In this case, an auxiliary definition was created so that @hireverb will match a verb whose stem is "hire", "name", "appoint", "promote", or some similar word.

Once such a verb is found, the rule goes up the tree to the nearest clause node and verifies that the clause contains a passive verb. If it is true that the clause contains a passive verb, the rule goes back down into the clause to find the patient of the clause verb. The patient of a verb is the object affected by the action of the verb, in this case the person being hired. In a passive sentence, the patient is typically the grammatical subject of the clause. Within the patient, the rule then looks for a specific Person as opposed to some descriptive phrase. If an actual person name is found as the patient of a hire verb, the rule can then mark it up with the XML tags <NewHire> and </NewHire>.

Finally, the rule tests other items in the clause until it finds a constituent that has the attribute position assigned to it. A dictionary of candidate job positions of interest is used to assign this attribute to the text. If a valid position is found, it can be marked up with the XML tags <Position> and </Position>.

The entire rule must succeed for the marking up of the text with both the <NewHire> and <Position> tags to take place.

The FEX tool set system architecture and design will now be described.

Figure 5:
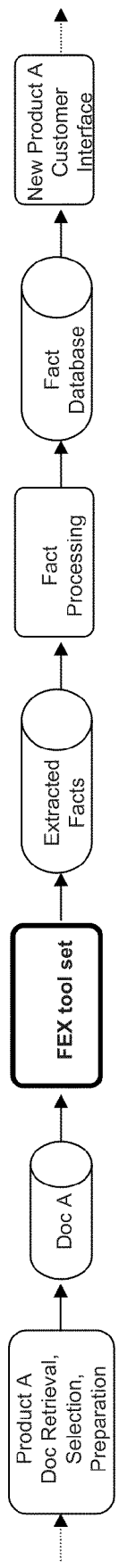
FIG. 5 is a diagrammatic illustration of a first scenario in which a FEX product creates a database with the facts extracted by the FEX tool set and provides a customer interface to present these facts from the database.

The FEX tool set is not itself a free-standing "application", in the sense that it does not, for example, provide functionality to retrieve documents for extraction or to store the extracted facts in any persistent store. Rather, the FEX tool set typically exists as part of a larger application. Because document retrieval and preparation and presentation of extracted facts will vary depending on product requirements, these functions are left to the product applications that use the FEX tool set (the "FEX product"). FIG. 5 is a diagrammatic illustration of a first scenario in which a FEX product "A" creates a database with the facts extracted from a document "A" by the FEX tool set and provides an entirely new customer interface (UI) to present these facts from the database. In the first scenario, the original document "A" remains untouched both by the FEX tool set and by the FEX product "A."

Figure 6:
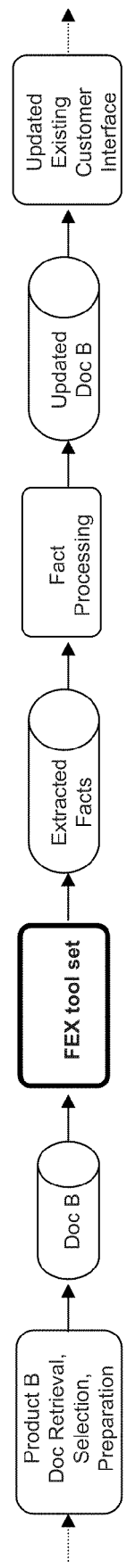
FIG. 6 is a diagrammatic illustration of a second scenario in which an FEX product updates an original document with extracted facts metadata and leverages an existing customer interface to present the facts.

FIG. 6 is a diagrammatic illustration of a second scenario in which an FEX product "B" actually updates an original document "B" with the extracted facts metadata and leverages the existing customer interface—possibly updated—to present the facts. The second scenario allows for the existing search technology to access the facts, requiring no new retrieval mechanism.

Figure 7:
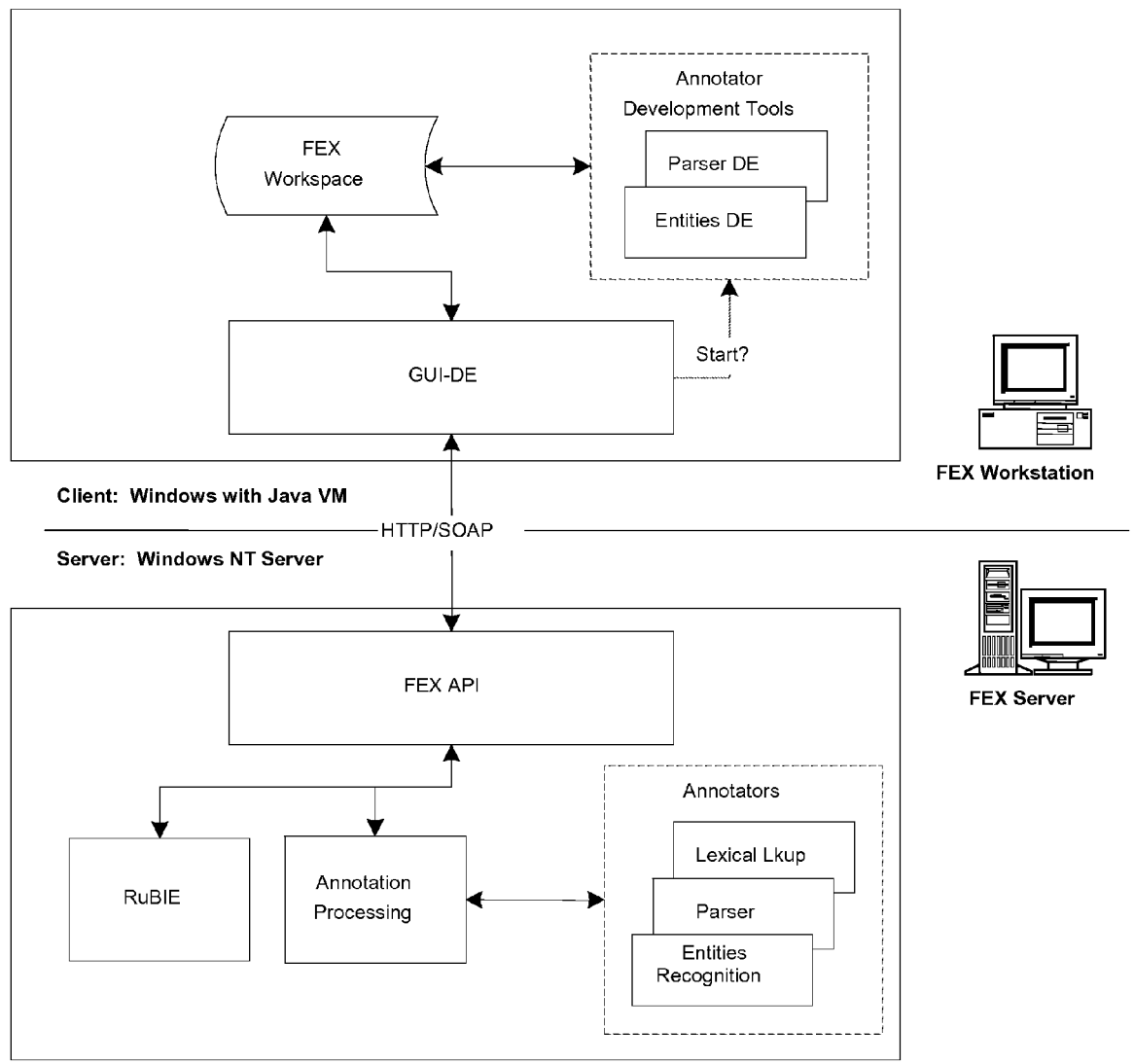
FIG. 7 is a diagrammatic illustration of the FEX tool set architecture.

FIG. 7 is a diagrammatic illustration of the FEX tool set architecture. In the present embodiment, the FEX tool set has a Windows NT client-server architecture, using Java® and ActiveState® Perl™. Windows NT was chosen because it is a standard operating environment and because the primary annotator (a linguistic parser called EngPars) currently runs exclusively on the Windows architecture. Java®, implemented with IBM Visual Age for Java®, is used primarily because of its graphical user interface development environment (GUI-DE), since it is a LexisNexis®-internal standard and provides strong portability and scalability. ActiveState® Perl™ is used to implement some of the text-processing tasks, since Perl™ is also portable, and since it has strong regular expression handling and general text-processing capability. It will be appreciated by those of skill in the art that other architectures that provide equivalent functionality can be used.

The major hardware components in the FEX tool set are the FEX client and the FEX server. In the present embodiment, the client for the FEX tool set is a "thin" Java®-based Windows NT® Workstation or Windows 98/2000® system. The FEX server is a Windows NT Server system, a web server that provides the main functionality of the FEX tool set. Functionality is made available to the client via a standard HTTP interface, which can include SOAP ("Simple Object Access Protocol", an HTTP protocol that uses XML for packaging).

While this architecture allows for true client-server interaction, it also allows for a reasonable migration to a single-machine solution, in which both the client and server parts are installed on the same workstation.

Figure 8:
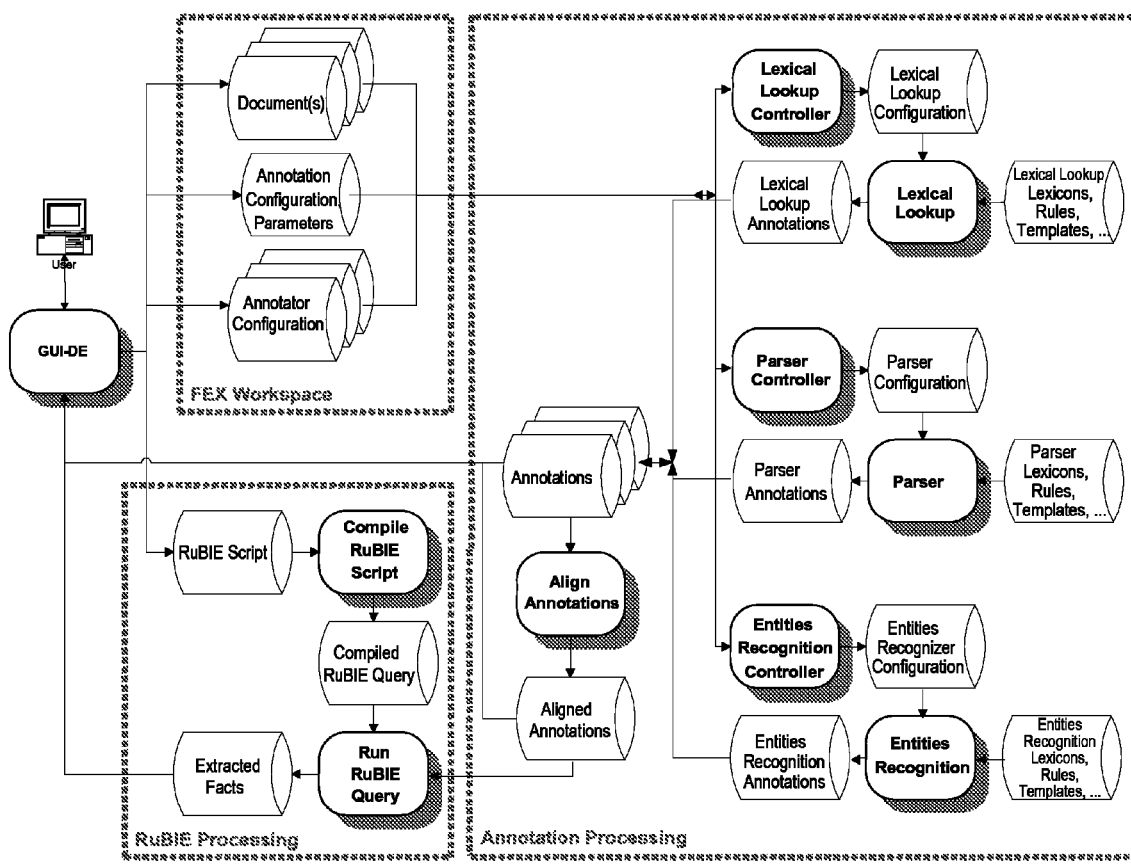
FIG. 8 is a high level flow diagram for the processing flow of the FEX tool set using the architecture shown in FIG. 7.

FIG. 8 is a high level diagram of the processing flow of the FEX tool set using the architecture shown in FIG. 7. The user's interface to the FEX tool set is the FEX GUI-DE on the FEX Workstation. Within GUI-DE, the user opens or creates a FEX Workspace to store his or her product application work. The user selects the appropriate annotators and may use available client Annotator Development Tools (not part of the FEX tool set) to troubleshoot and tune the FEX Annotators for the application. When satisfied with the results from the development tools, the user saves the annotation settings to the Annotation Configuration in his or her workspace. The user may then request Annotation Processing to run the relevant FEX Annotators (such as some lexical lookup tool or natural language parser) and Align Annotation results on the FEX Server. From these results, the user can further tune the Annotation Configuration, if necessary.

The FEX GUI-DE provides the user interface to the FEX tool set. The user uses editing tools in the FEX GUI-DE to create and maintain Notation Configuration information, RuBIE annotation files (scripts), and possibly other annotation files like dictionaries or annotator parameter information. The FEX GUI-DE also allows the user to create and maintain Workspaces, in which the user stores annotation configurations, RuBIE application files, and other files for each logical work grouping. The user also uses the FEX GUI-DE to start annotation and RuBIE processing on the FEX Server and to "move up" files into production space on the network.

Once satisfied with the annotation results, the user writes a RuBIE application file in GUI-DE to define the patterns and relationships to extract from these annotations, and saves the file to the FEX Workspace. The user can then compile the RuBIE application file on the FEX Server and apply it against the annotations to extract the targeted facts. The user can then inspect the facts to troubleshoot and further tune the script or re-visit the annotations.

When the user is satisfied with the performance of the Annotation Configuration and the RuBIE application file, the resulting extracted facts become available for use by the product application.

The primary FEX annotators preferably run on the FEX server, since annotators can be very processor- and memory-intensive. It is these annotators that are actually run by FEX when documents are processed for facts, based on parameters provided by the user. Some FEX annotators may also reside in some form independently on the FEX client.

Modifications and variations of the above-described embodiments of the present invention are possible, as appreciated by those skilled in the art in light of the above teachings. For example, additional attributes may be introduced that can be exploited by the RuBIE pattern recognition language, such as the results of a semantic disambiguation process. Additional discourse processing may be used to identify additional related non-contiguous tokens, such as robust coreference resolution. Information extraction application-specific annotators may also be introduced. A pharmaceutical information extraction application, for example, may require annotators that recognize and classify gene names, drug names and chemical compounds. It is therefore to be understood that, within the scope of the appended claims and their equivalents, the invention may be practiced otherwise than as specifically described.

We claim:

1. A fact extraction tool set for extracting information from a document, implemented using a client-server hardware architecture, wherein the document includes text, comprising:

means for breaking the text into tokens;

a plurality of independent means for annotating the text with token attributes, constituent attributes, links, and tree-based attributes, using XML as a basis for representing the annotated text, wherein each of the means for annotating has at least one specific annotating function;

means for resolving conflicting annotation boundaries in the annotated text, to produce a single XML-based representation of the document with well-formed XML, wherein the conflicting annotation boundaries result from annotating the text using a plurality of independent means for annotating; and means for extracting facts from the single XML-based representation of the document using text pattern recognition rules, wherein each text pattern recognition rule comprises a pattern that describes text of interest, a label that names the pattern for testing and debugging purposes, and an action that indicates what should be done in response to a matching of the pattern, wherein the text pattern recognition rules independently identify constituents by use of regular expression-based functionality, tree traversal functionality based on a language that can navigate XML representations of text, and user-defined matching functionality, and wherein the regular expression-based functionality identifies sequential constituents, and the tree traversal functionality identifies non-contiguous constituents that are distinct from the sequential constituents identified by the regular expression-based functionality.

2. The fact extraction tool set of claim 1, wherein the attributes include tokenization, text normalization, part of speech tags, sentence boundaries, parse trees, and semantic attribute tagging.

3. The fact extraction tool set of claim 1, wherein the means for annotating the text comprises a plurality of independent annotators, wherein each of the annotators has at least one specific annotation function, and wherein the fact extraction tool set further comprises user-implemented means for specifying which of the annotators to use the order of their use.

4. The fact extraction tool set of claim 1, wherein:

the token attributes have a one-per-base-token alignment, where for the attribute type represented, there is an attempt to assign an attribute to each base token;

the constituent attributes are assigned yes-no values, where the entire pattern of each base token is considered to be a single constituent with respect to some annotation value; and the links assign common identifiers to coreferring and other related patterns of base tokens.

5. The fact extraction tool set of claim 1, wherein the pattern recognition rules query for at least one of literal text, attributes, and relationships found in the annotated text to define facts to be extracted.

6. The fact extraction tool set of claim 1, wherein the means for extracting uses XPath for traversing XML-based tree representations in the annotated text.

7. The fact extraction tool set of claim 1, further comprising:

means for associating all annotations assigned to a particular piece of text with the base tokens for that text to generate aligned annotations; and wherein each text pattern recognition rule queries for at least one of literal text, attributes, and relationship found in the aligned annotations to define the facts to be extracted.

8. The fact extraction tool set of claim 7, wherein the user-defined matching functions are used to name and define a fragment of a pattern.

9. The fact extraction tool set of claim 7, wherein the means for extracting uses XPath for traversing XML-based tree representations in the annotated text.

10. A non-transitory computer usable storage medium storing computer readable program code, which is executed by a processor, where the computer readable program code includes a rule-based information extraction language for use in identifying and extracting potentially interesting pieces of information in aligned annotations in a single XML-based representation of a document including text, the language comprising a plurality of text pattern recognition rules that query for at least one of literal text, attributes, and relationships found in the aligned annotations to define to be extracted, wherein each of the text pattern recognition rules comprises:

a pattern that describes text of interest;

a label that names the pattern for testing and debugging purposes; and an action that indicates what should be done in response to a matching of the pattern; and wherein the text pattern recognition rules independently identify constituents by use of regular expression-based functionality, tree traversal functionality based on a language that can navigate XML representations of text, and user-defined matching functionality, and wherein the regular expression-based functionality identifies sequential constituents, and the tree traversal functionality identifies non-contiguous constituents that are distinct from the sequential constituents identified by the regular expression-based functionality.

11. The non-transitory computer usable storage medium of claim 10, wherein the user-defined matching functions are used to name and define a fragment of a pattern.

12. A text annotation tool implemented using a client-server hardware architecture, comprising:

means for breaking text into its base tokens;

a plurality of independent annotators executed by the client-server hardware architecture for annotating the text with token attributes, constituent attributes, links, and tree-based attributes, using XML as a basis for representing the annotated text, wherein each of the annotators has a least one specific annotation function;

means for enabling a user to specify which of the annotators to use and the order of their use;

means for associating all annotations assigned to a particular piece of text with the base tokens for that particular piece of text to generate aligned annotations; and means for resolving conflicting annotation boundaries in the annotated text resulting from two or more conflicting independent annotators to produce a single XML-based representation of the document with well-formed XML, wherein the conflicting annotation boundaries result from annotating the text using a plurality of independent means for annotating.

13. The text annotation tool of claim 12, wherein the attributes include tokenization, text normalization, part of speech tags, sentence boundaries, parse trees, and semantic attribute tagging.

14. The text annotation tool of claim 12, wherein:

the token attributes have a one-per-base-token alignment, where for the attribute type represented, there is an attempt to assign an attribute to each base token;

the constituent attributes are assigned yes-no values, where the entire pattern of each base token is considered to be a signal constituent with respect to some annotation value; and where the links assign common identifiers to coreferring and other related patterns of base tokens.

15. A method of extracting information from a document, implemented using a client-server hardware architecture, wherein the document includes text, comprising the steps of:

breaking the text into tokens, using the client-server hardware architecture;

annotating the text with token attributes, constituent attributes, links, and tree-based attributes, using XML as a basis for representing the annotated text, using a plurality of independent annotators executed by the client-server hardware architecture, each of the annotators having at least one specific annotation function;

resolving conflicting annotation boundaries in the annotated text to produce a single XML-based representation of the document with well-formed XML, using the client-server hardware architecture, wherein the conflicting annotation boundaries result from annotating the text using a plurality of independent annotators; and extracting facts from the annotated text using text pattern recognition rules written in rule-based information extraction language, using the client-server hardware architecture, wherein each text pattern recognition rule comprises a pattern that describes text of interest, a label that names the pattern for testing and debugging purposes, and an action that indicates what should be done in response to a matching of the pattern, and wherein the text pattern recognition rules independently identify constituents by use of regular expression-based functionality, tree traversal functionality based on a language that can navigate XML representation of text, and user-defined matching functionality, and wherein the regular expression-based functionality identifies sequential constituents, and the tree traversal functionality identifies non-contiguous constituents that are distinct fro the sequential constituents identified by the regular expression-based functionality.

16. The method of claim 15, wherein the annotating step, the attributes include orthographic, syntactic, semantic, pragmatic and dictionary-based attributes.

17. The method of claim 15, wherein the annotating step is carried out by a plurality of independent annotators executed by the client-server hardware architecture, wherein each of the annotators has at least one specific annotation function, and wherein the method further comprises the step of allowing a user to specify which of the annotators to use and the order of their use.

18. The method of claim 15, wherein:

the token attributes have a one-per-base-token alignment, where for the attribute type represented, there is an attempt to assign an attributed to each base token;

the constituent attributes are assigned yes-no values, where the entire pattern of each base token is considered to be a single constituent with respect to some annotation value; and the links assign common identifiers to coreferring and other related patters of base tokens.

19. The method of claim 15, wherein the annotating step includes associating all annotations assigned to a particular piece of text with the base tokens for that text to generate aligned annotations, using the client-server hardware architecture.

20. The method of claim 15, wherein the text pattern recognition rules query for at least one of literal text, attributes, and relationships found in the aligned annotations to define the facts to be extracted.

21. The method of claim 15, wherein the extracting in the extracting step, XPath is used for traversing XML-based tree representations in the annotated text.

* * * * *